(12) United States Patent
Kim

(10) Patent No.: US 12,066,879 B2
(45) Date of Patent: Aug. 20, 2024

(54) MULTI-PORT ADAPTOR SUPPORTING POWER DELIVERY AND PORTABLE ELECTRONIC DEVICE CONNECTED THERETO

(71) Applicant: SAMSUNG ELECTRONICS CO., LTD., Suwon-si (KR)

(72) Inventor: Kyoungwon Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/900,143

(22) Filed: Aug. 31, 2022

(65) Prior Publication Data

US 2023/0128935 A1     Apr. 27, 2023

Related U.S. Application Data

(63) Continuation of application No. PCT/KR2022/010098, filed on Jul. 12, 2022.

(30) Foreign Application Priority Data

Oct. 22, 2021   (KR) .................. 10-2021-0141601
Dec. 3, 2021    (KR) .................. 10-2021-0172364

(51) Int. Cl.
  *G06F 1/26*     (2006.01)
  *G06F 1/3215*   (2019.01)

(52) U.S. Cl.
  CPC ............ *G06F 1/266* (2013.01); *G06F 1/3215* (2013.01)

(58) Field of Classification Search
  CPC .................................. G06F 1/266; G06F 1/3215
  (Continued)

(56) References Cited

U.S. PATENT DOCUMENTS 10,707,688 B2    7/2020  Kang
10,860,074 B2 * 12/2020  Kuroi .................. G06F 1/305
(Continued)

FOREIGN PATENT DOCUMENTS

JP    2018116342 A  *  7/2018
KR    20150097330 A     8/2015
(Continued)

OTHER PUBLICATIONS

International Search Report and Written Opinion for International Application No. PCT/KR2022/010098; International Filing Date Jul. 12, 2022; dated Oct. 20, 2022; 69 Pages.

*Primary Examiner* — Chun Cao
(74) *Attorney, Agent, or Firm* — CANTOR COLBURN LLP

(57) ABSTRACT

Multiport adapters include a power connection port, a host connection port, a peripheral device connection port, a controller, and a power supply circuit. The controller is configured to receive, through the power connection port, first power information regarding power suppliable from a power supply device to the multiport adapter, determine a maximum power value in the first power information, transmit a message requesting the power supply device to supply power of the maximum power value to the multiport adapter, determine a third power value obtained by subtracting, from the maximum power value, a first power value consumed by the multiport adapter and a second power value set to be supplied to a peripheral device, generate, based on the third power value, second power information regarding power suppliable from the multiport adapter to a host device, and transmit the second power information to the host device through the host connection port.

13 Claims, 17 Drawing Sheets

(58) Field of Classification Search
USPC .......................................................... 713/300
See application file for complete search history.

(56) References Cited

U.S. PATENT DOCUMENTS

| | | | |
|---|---|---|---|
| 11,061,457 | B1 | 7/2021 | Bhattacharjee et al. |
| 11,334,131 | B2 | 5/2022 | Seiler et al. |
| 11,768,529 | B2 * | 9/2023 | Bhagavathula ............ G06F 1/26 |
| | | | 713/300 |
| 2015/0236528 | A1 | 8/2015 | Kim et al. |
| 2017/0222459 | A1 | 8/2017 | Kang |
| 2017/0353113 | A1 | 12/2017 | Ono |
| 2017/0364463 | A1 | 12/2017 | Chen |
| 2018/0198248 | A1 | 7/2018 | Sun et al. |
| 2020/0395772 | A1 | 12/2020 | Hsu |
| 2021/0072808 | A1 | 3/2021 | Kim et al. |
| 2021/0181794 | A1 | 6/2021 | Chung et al. |
| 2021/0191486 | A1 * | 6/2021 | Chen ........................ G06F 1/266 |
| 2021/0232526 | A1 | 7/2021 | Sultenfuss et al. |
| 2022/0253116 | A1 * | 8/2022 | Satyanarayana ...... G06F 13/385 |
| 2022/0261056 | A1 * | 8/2022 | Motoi ...................... G09G 5/12 |

FOREIGN PATENT DOCUMENTS

| | | | |
|---|---|---|---|
| KR | 20170092352 | A | 8/2017 |
| KR | 20170097763 | A | 8/2017 |
| KR | 20170108069 | A | 9/2017 |
| KR | 20210031215 | A | 3/2021 |
| WO | 2020141511 | A1 | 7/2020 |

* cited by examiner

MULTI-PORT ADAPTOR SUPPORTING POWER DELIVERY AND PORTABLE ELECTRONIC DEVICE CONNECTED THERETO

CROSS-REFERENCE TO RELATED APPLICATION(S)

This application is based on and claims priority under 35 U.S.C. § 120 to PCT International Application No. PCT/KR2022/010098, which was filed on Jul. 12, 2022, and claims priority to Korean Patent Application No. 10-2021-0172364, filed on Dec. 3, 2021 and No. 10-2021-0141601, filed on Oct. 22, 2021, in the Korean Intellectual Property Office, the disclosure of which are incorporated by reference herein their entirety.

TECHNICAL FIELD

Various embodiments relate to a technology for supplying power from a power supply device to an electronic device through a multi-port adaptor ("MPA").

BACKGROUND ART

An electronic device (or host device) such as a smartphone, tablet, personal computer, or other electronic device may be configured to receive power through a multi-port adaptor (hereinafter, referred to as an "MPA") and may charge a battery by using the received power. In addition, the electronic device may connect to an external electronic device (or peripheral device) (for example, a printer, a display, a modem or a router for connecting to the Internet) through the MPA.

DISCLOSURE

Technical Problem

The MPA may include multiple ports connected to a host device, a power supply device, and a peripheral device, respectively. The MPA may be connected to the power supply device through one of the ports, may consume a part of power received from the power supply device as power necessary to drive the MPA, and may allocate the remaining power to each port.

The MPA may distribute power received from the power supply device and may provide the same to electronic devices connected to the MPA. If one of the connected electronic devices requires larger power from the MPA than provided from the normal distribution from the MPA, there may be an imbalance between power input to the MPA and power output from the MPA. For example, the output power may be larger than the input power, thereby causing an imbalance.

Technical Solution

An MPA according to various embodiments may supply power to an electronic device connected to the MPA while preventing or reducing an imbalance between power input and power output.

Technical problems to be solved by the disclosure are not limited to the above-mentioned technical problems, and other technical problems not mentioned herein will be clearly understood from the following description by those skilled in the art to which the disclosure pertains.

In an embodiment, a multiport adapter may include: a power connection port connectable to a power supply device; a host connection port connectable to a host device; a peripheral device connection port connectable to a peripheral device; a controller electrically connected to the power connection port, the host connection port, and the peripheral device connection port; and a power supply circuit configured to receive power from the power supply device through the power connection port, divide the received power, and output the divided power to the host connection port, the peripheral device connection port, and the controller. The controller may be configured to receive, through the power connection port, first power information regarding power suppliable from the power supply device to the multiport adapter, determine a maximum power value in the first power information and transmit a message, which requests the power supply device to supply power of the maximum power value to the multiport adapter, to the power supply device through the power connection port, determine a third power value obtained by subtracting, from the maximum power value, a first power value consumed by the multiport adapter and a second power value set to be supplied to a peripheral device through the peripheral device connection port, generate, based on the third power value, second power information about power suppliable from the multiport adapter to the host device, and transmit the second power information to the host device through the host connection port.

In an embodiment, a portable host device may include: a display; a connection port; and a processor electrically connected to the display and the connection port. The processor may be configured to recognize, based on identification information received from an external electronic device through the connection port, that the external electronic device connected to the connection port is a multiport adapter, display, on the display, a setting screen for setting a power value for each port of the multiport adapter, generate setting data based on a user input received using the setting screen, and transmit the setting data to the multiport adapter through the connection port, receive power information about power suppliable from the multiport adapter to the host device from the multiport adapter through the connection port in response to the transmission of the setting data, and transmit, based on the power information, a message requesting the multiport adapter to supply power to the multiport adapter through the connection port.

In an embodiment, a method for operating a portable host device may include: recognizing, based on identification information received from an external electronic device through a connection port of the host device, that the external electronic device connected to the connection port is a multiport adapter; displaying, on a display of the host device, a setting screen for setting a power value for each port of the multiport adapter; generating setting data based on a user input received using the setting screen, and transmitting the setting data to the multiport adapter through the connection port; receiving power information about power suppliable from the multiport adapter to the host device from the multiport adapter through the connection port in response to the transmission of the setting data; and transmitting, based on the power information, a message requesting the multiport adapter to supply power to the multiport adapter through the connection port.

Advantageous Effects

According to various embodiments, an MPA may supply stable power to an electronic device. Various other advantageous effects identified explicitly or implicitly through the disclosure may be provided.

MODE FOR INVENTION

Figure 1:
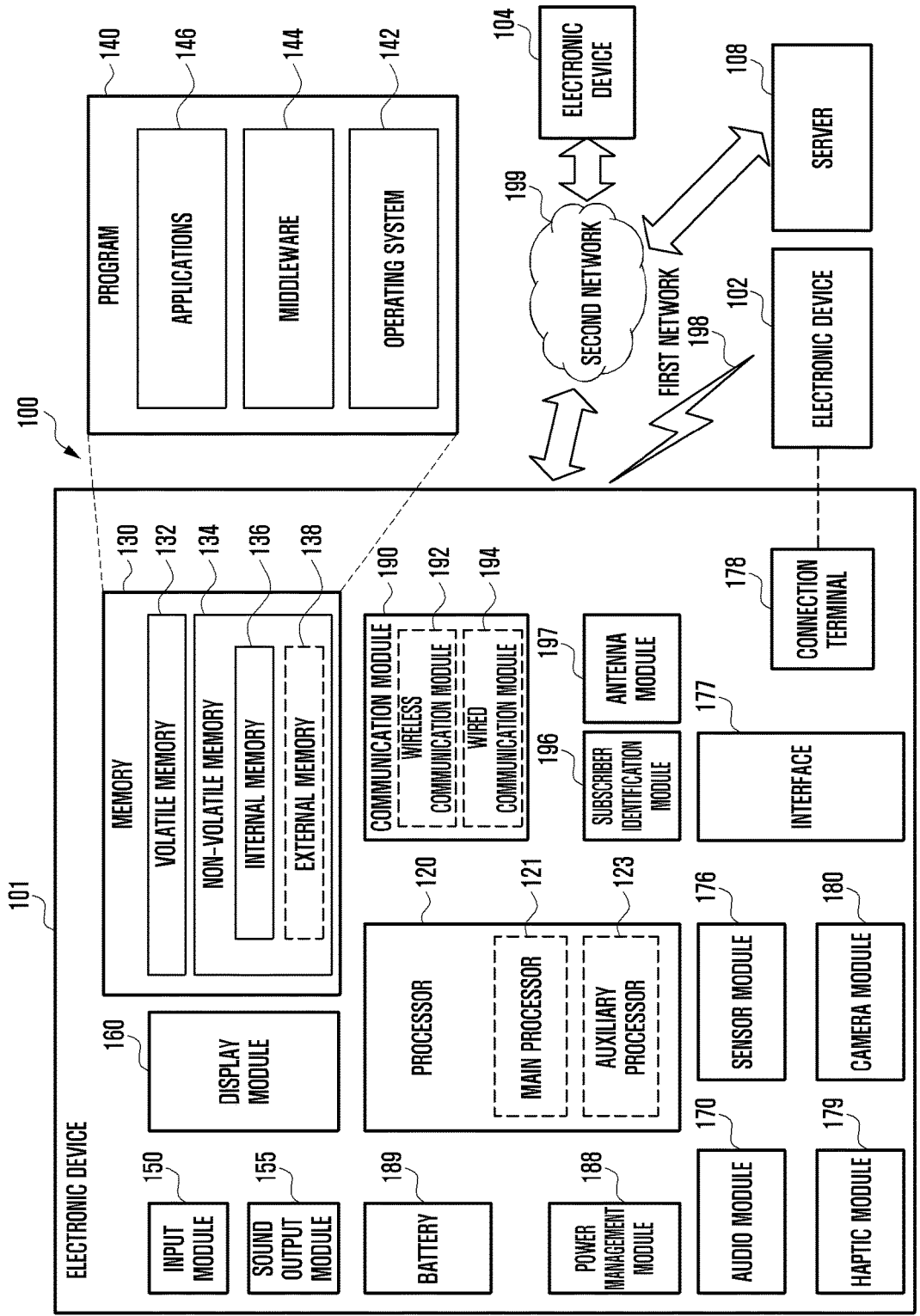
FIG. 1 is a block diagram of an electronic device in a network environment according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "first component," "first region," "first layer," or "first section" discussed below could be termed a second element, component, region, layer, or section without departing from the teachings herein.

The terminology used herein is for the purpose of describing particular embodiments only and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
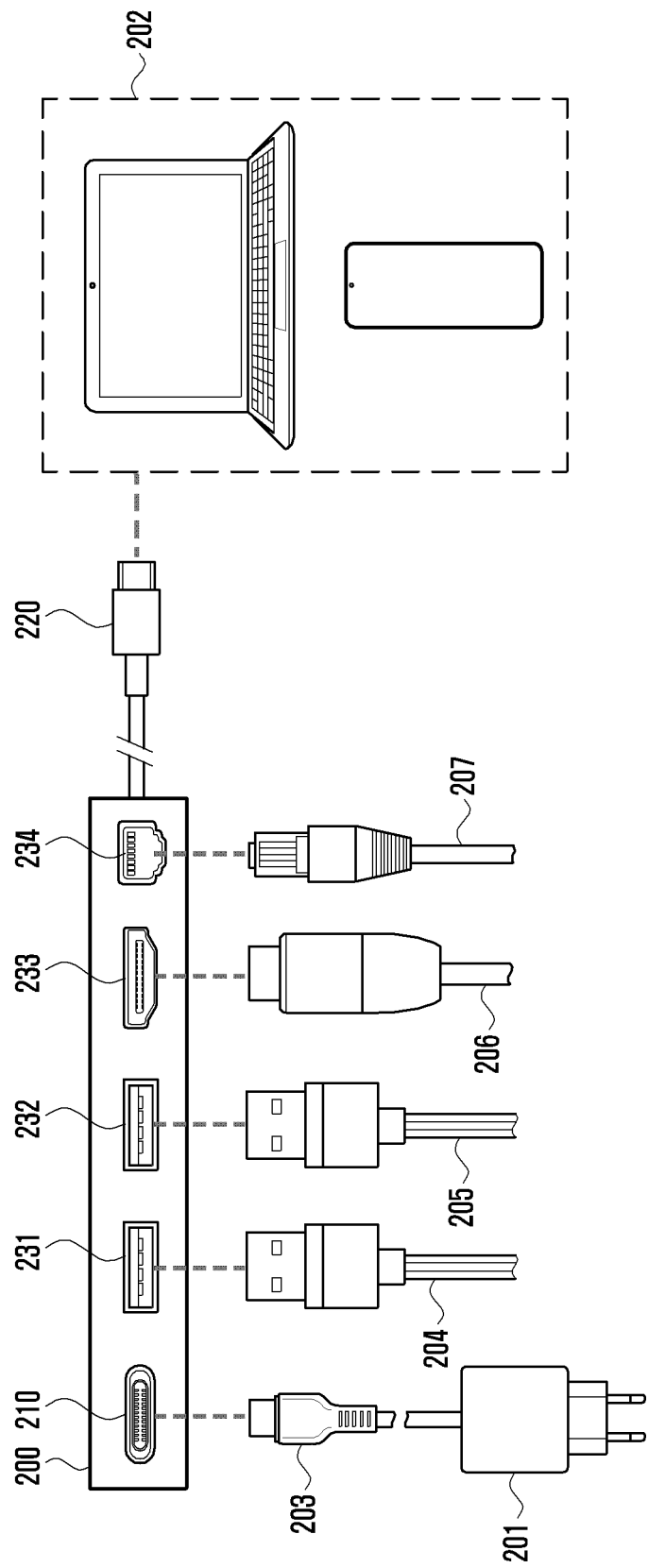
FIG. 2A illustrates a schematic diagram of the exterior of a multiport adapter according to an embodiment.
Figure 2B:
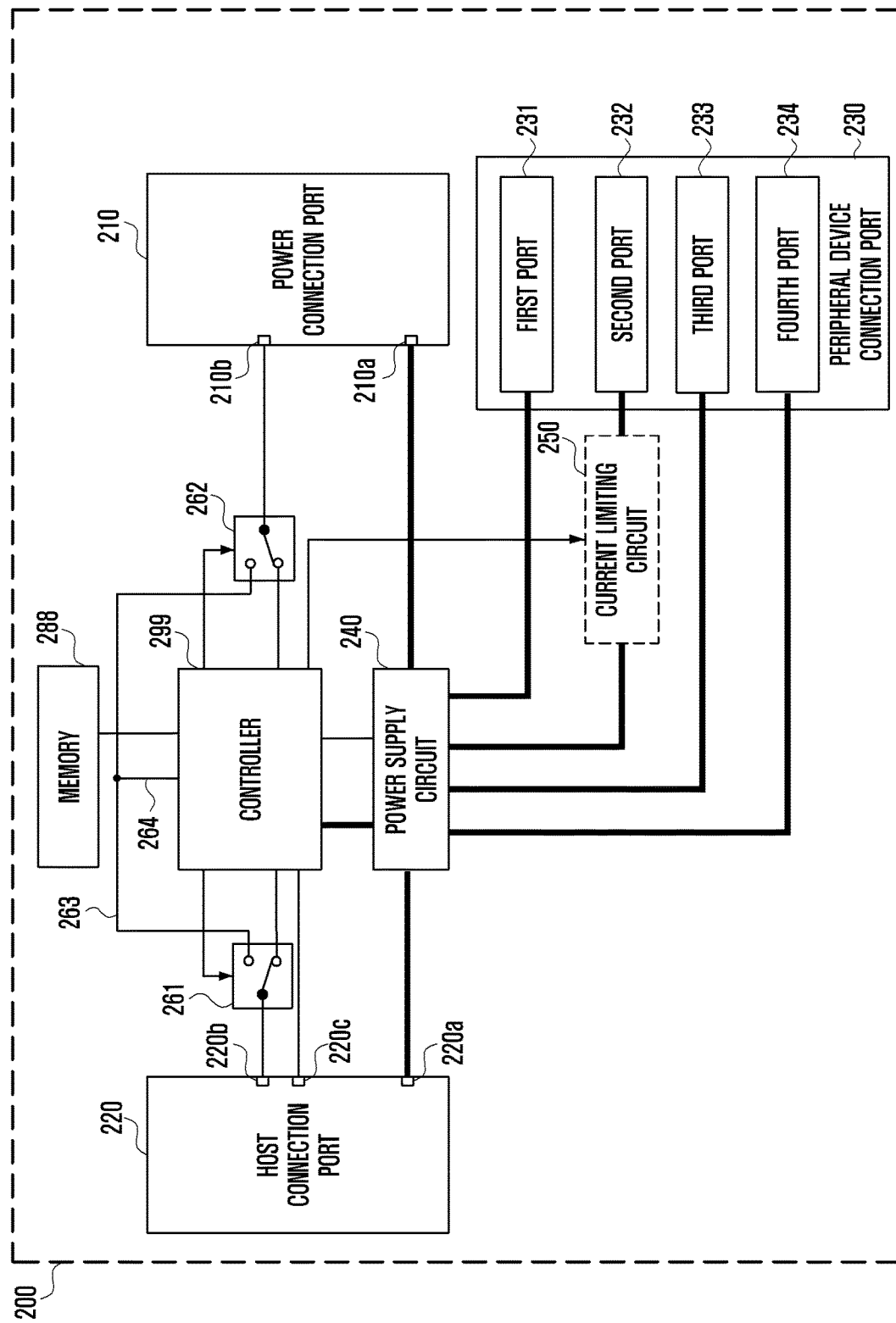
FIG. 2B is an electrical block diagram of the multiport adapter in FIG. 2A.
Figure 3:
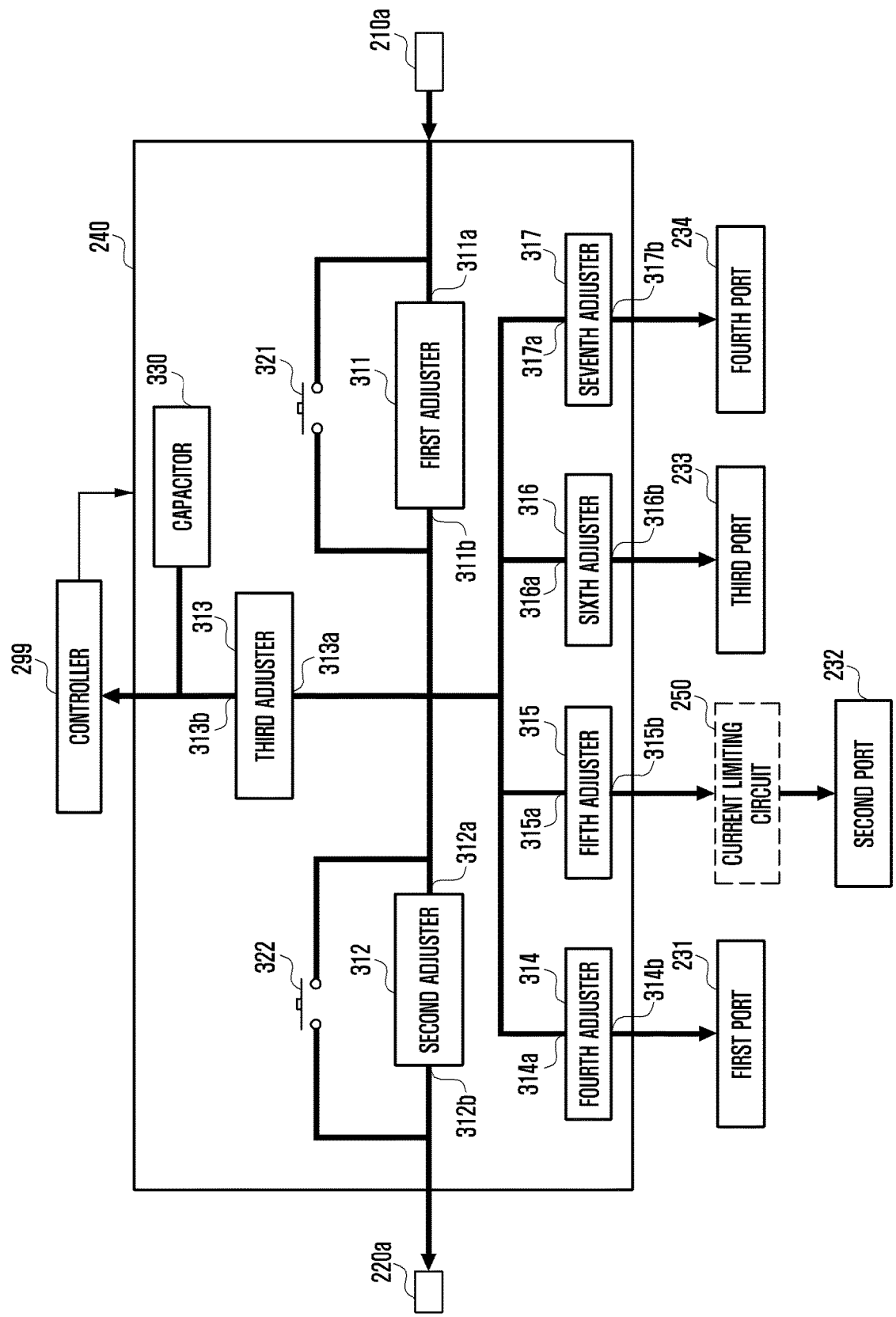
FIG. 3 is a block diagram of a power supply circuit in the multiport adapter in FIG. 2B.
Figure 4A:
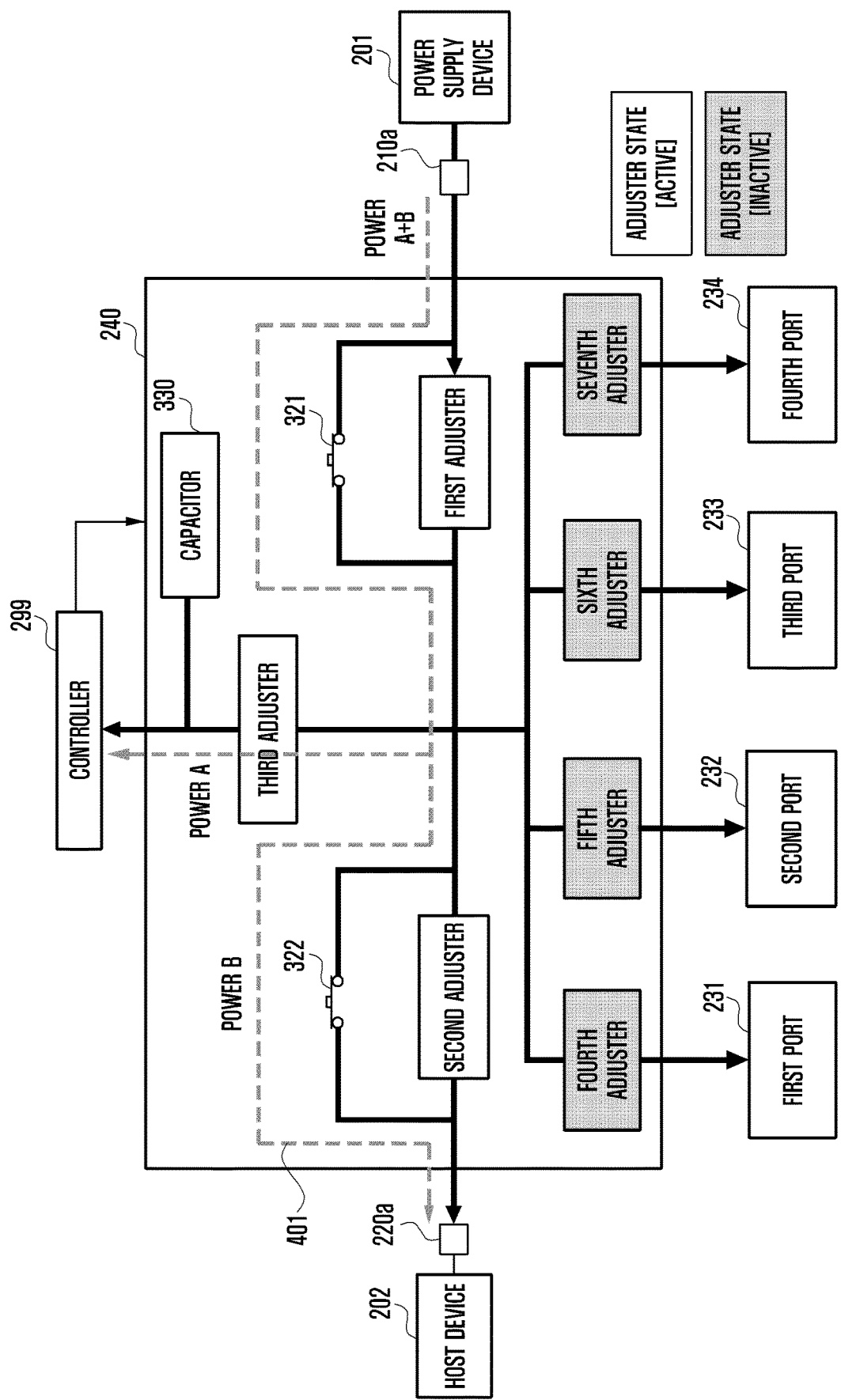
FIG. 4A is a schematic diagram for describing a control operation of a controller in the multiport adapter in FIG. 2B.
Figure 4B:
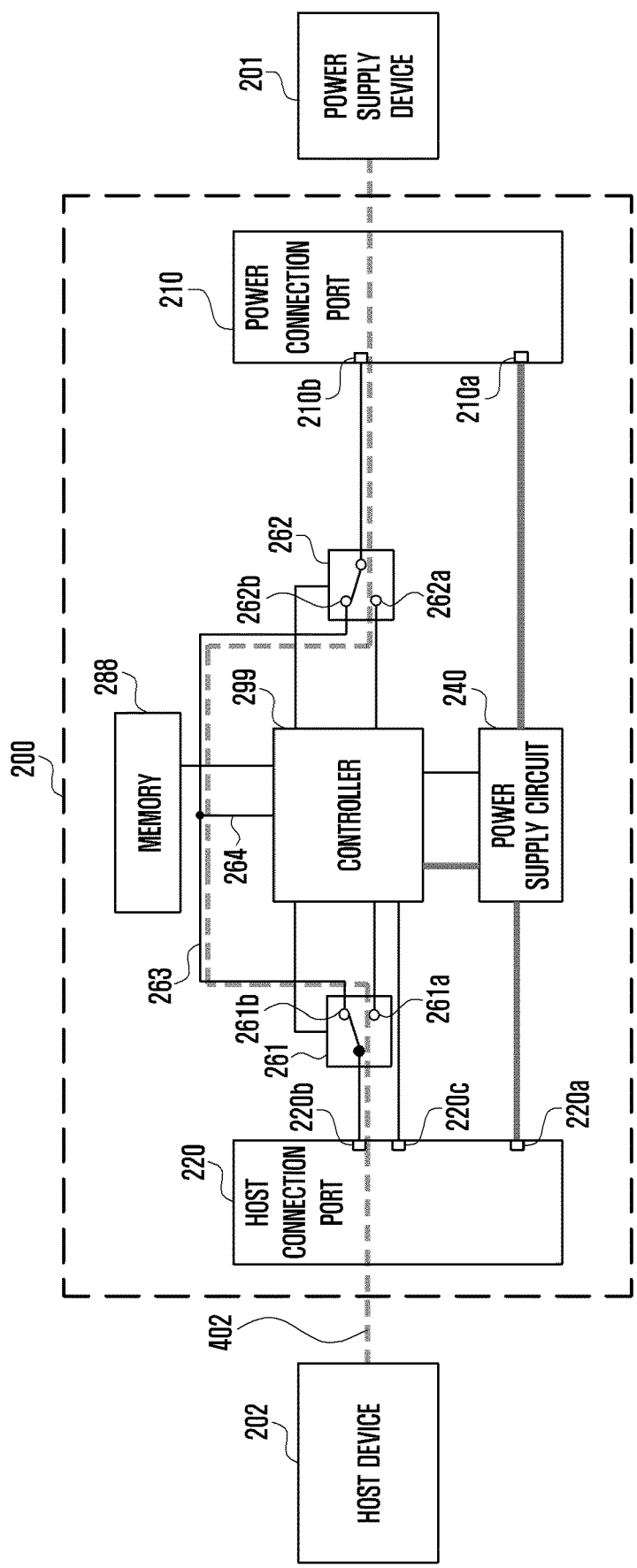
FIG. 4B is a another schematic diagram for describing a control operation of a controller in the multiport adapter in FIG. 2B.

FIG. 2A is a schematic illustration of the exterior of a multiport adapter 200 according to an embodiment. FIG. 2B is an electrical block diagram of the multiport adapter 200 in FIG. 2A. FIG. 3 is a block diagram of a power supply circuit 240 in the multiport adapter 200 in FIG. 2B. FIGS. 4A and 4B are schematic diagrams for describing a control operation of a controller 299 in the multiport adapter 200 in FIG. 2B.

Referring to FIGS. 2A and 2B, a multiport adapter (hereinafter, "MPA") 200 (e.g., the electronic device 102 in FIG. 1) may include a power connection port 210, a host connection port 220, a peripheral device connection port 230, a power supply circuit 240, a current limiting circuit 250, switches 261 and 262, a memory 288, and a controller 299.

The power connection port 210 may be connected to a power supply device 201 through a first cable 203 for power transmission and data communication. The power connection port 210 may include a power pin 210a (e.g., VBUS) for receiving power from the power supply device 201 and a signal pin 210b for data communication (e.g., data communication for power delivery (PD) (hereinafter, PD communication)) with the power supply device 201. According to an embodiment, the power connection port 210 may be formed as a socket according to universal serial bus (USB) Type-C. The first cable 203 may be a "USB Type-C to Type-C cable" having both terminals formed as USB type-C terminals. The socket of the power connection port 210 may be coupled to a plug of the first cable 203. The power supply device 201 may include an adapter (e.g., a travel adapter (TA)). For example, the power supply device 201 may convert current characteristics of power input from an external power source from an alternating current (AC) to a direct current (DC), and may adjust a voltage of the power to a designated voltage value. The power supply device 201 may perform, under control of the MPA 200 or a host device 202 (e.g., the electronic device 101 in FIG. 1) through the MPA 200, a variation function (e.g., programmable power supply (PPS)) for changing a power characteristic (e.g., a current and/or a voltage). For example, the power supply device 201 may reduce or increase a current of power to be output to the MPA 200, in response to a control signal received from the controller 299 of the MPA 200 or a control signal received from a processor (e.g., the processor 120 in FIG. 1) of the host device 202 through the MPA 200. The power supply device 201 may reduce or increase, in response to the control signal, a voltage of power to be output to the MPA 200. The power supply device 201 may be a model in which the variation function is not supported and a current and/or voltage of power is fixed to and output as a designated value. When the power supply device 201 is a model supporting the variation function, the power supply device 201 may change a voltage (or a current) of power to be output to an external portable electronic device (e.g., the host device 202) to a voltage value (or a current value) set to charge a battery (e.g., the battery 189 in FIG. 1) of the portable electronic device. When the power supply device 201 is a model which does not support the variation function, a charging circuit (e.g., the power management module 188) of the portable electronic device may adjust a voltage (or a current) of power received from the power supply device 201 into a voltage value (or a current value) that is set to charge the battery of the portable electronic device.

The host connection port 220 may be connected to the host device 202 (e.g., the electronic device 101 in FIG. 1). As illustrated, the host device 202 may be a smartphone or a notebook PC or other personal computing device (e.g., desktops, laptops, tablets, etc.). The illustrated host device 202 is merely an example, and various portable electronic devices of a user may be connected to the MPA 200 through the host connection port 220. The host connection port 220 may include a power pin 220a configured to transmit power received from the power supply device 201 to the host device 202, signal pins 220b and 220c for data communication between the host device 202 and the controller 299 (e.g., a first signal pin 220b and a second signal pin 220c for communication (e.g., power delivery (PD) communication)), and a signal pin for data communication between the host device 202 and a peripheral device connected to the peripheral device connection port 230. According to an embodiment, and as schematically shown in FIG. 2A, the host connection port 220 may be formed as a plug according to USB Type-C. The plug may be coupled to a USB Type-C socket of the host device 202.

The peripheral device connection port 230 may include at least one port. Each port may be connected to a peripheral device through a cable for power transmission and data communication. The peripheral device may perform data communication with the host device 202 through the port 230. Furthermore, the peripheral device may receive power through the port 230. For example, the peripheral device connection port 230 may include a first port 231, a second port 232, a third port 233, and a fourth port 234. In the illustration, the total number of the peripheral device ports 230 is four, but this is merely one example, and the number may be smaller or larger. Each port may include a power pin for transmitting power received from the power supply device 201 to a connected peripheral device, and at least one signal pin for data communication between the host device 202 and the connected peripheral device. For example, the first port 231 may be formed as a socket according to USB Type-A (or B) and may be connected to a peripheral device (e.g., a USB memory card, an auxiliary memory device, or an auxiliary battery) through a second cable 204. The second port 232 may be formed as a socket according to USB Type-A (or B), and may be connected to a peripheral device (e.g., a USB memory card, an auxiliary memory device, or an auxiliary battery) through a third cable 205. The third port 233 may be formed as a socket according to high-definition multimedia interface (HDMI), and may be connected to a peripheral device (e.g., a display device) through a fourth cable 206. The fourth port 234 may be formed as an ethernet port, and may be connected to a peripheral device (e.g., a modem or a router for connection to Internet).

The power supply circuit 240 may receive power from the power supply device 201 through the power pin 210a of the power connection port 210, and may supply the remaining power other than power consumed by the MPA 200 to one or more electronic devices (e.g., the host device 202 and/or the peripheral device(s)) connected to the MPA 200 through the peripheral device port 230. In an embodiment, the power supply circuit 240 may supply a part of the power received from the power supply device 201 to the controller 299 as power for driving the controller 299, and may allocate, under control of the controller 299, the remaining power other than power consumed by the MPA 200, among the power received from the power supply device 201, to the host connection port 220 and the peripheral device connection port 230. In accordance with some embodiments, the power consumed by the MPA 200 may include power that is consumed by the power supply circuit 240 in order to adjust a voltage and/or a current of power.

Referring to FIG. 3, the power supply circuit 240 may include adjusters 311, 312, 313, 314, 315, 316, 317, switches 321 and 322, and a capacitor 330.

The adjusters 311-317 may adjust, under control of the controller 299, a characteristic (e.g., a current and/or a voltage) of power received through an input terminal, and may output the power having the adjusted characteristic to the outside through an output terminal. The adjusters 311-317 may switch, under control of the controller 299, from active state (or an on-state) to inactive state (or an off-state), or vice versa. An input terminal 311a of a first adjuster 311 may be connected to the power pin 210a of the power connection port 210. Input terminals 312a-317a of the respective adjusters 312-317 may be connected to an output terminal 311b of the first adjuster 311. An output terminal 312b of a second adjuster 312 may be connected to the power pin 220a of the host connection port 220. An output terminal 313b of a third adjuster 313 may be connected to the controller 299 and the capacitor 330. An output terminal 314b of a fourth adjuster 314 may be connected to the first port 231. An output terminal 315b of a fifth adjuster 315 may be connected to the second port 232. An output terminal 316b of a sixth adjuster 316 may be connected to the third port 233. An output terminal 317b of a seventh adjuster 317 may be connected to the fourth port 234.

The switches 321 and 322 may switch, under control of the controller 299, from a closed state (or an on-state) to an open state (or an off-state), or vice versa. Both terminals of a third switch 321 may be connected to both terminals 311a and 311b of the first adjuster 311, respectively. Both terminals of a fourth switch 322 may be connected to both terminals 312a and 312b of the second adjuster 312, respectively.

The controller 299 may control the power supply circuit 240 to form, in the MPA 200, a power line 401 (shown in FIG. 4A) for directly connecting the power supply device 201 to the host device 202. For example, the controller 299 may deactivate adjusters 311, 312, 314, 315, 316, 317 other than the third adjuster 313 in the power supply circuit 240, and may close the third switch 321 and the fourth switch 322. Accordingly, referring to FIG. 4A, power A+B from the power supply device 201 may be supplied to the MPA 200 through the power pin 210a of the power connection port 210. Power A, which is a part of power A+B, may be supplied to the controller 299 through the third adjuster 313, and power B, which is the remaining power of power A+B (or balance after power A is directed to the controller 299), may be supplied to the host device 202 through the power pin 220a of the host connection port 220. Power A may be a very small part of the power received from the power supply device 201 through the power pin 210a, and power B, which is most of the power supplied through the power pin 210a, may be supplied to the host device 202 through the power line 401.

The capacitor 330 may store power received from the output terminal 313b of the third adjuster 313 so as to smoothly and stably supply power to the controller 299. For example, the capacitor 330 may include a supercapacitor.

The current limiting circuit 250 (FIGS. 2B, 3) may limit, under control of the controller 299, a current of output power to a threshold value or less such that imbalance between power input from the power supply device 201 and power output to a power reception device does not occur. For example, as illustrated in FIG. 3, the current limiting circuit 250 may be formed between the output terminal 315b of the fifth adjuster 315 and the second port 232, thereby limiting a current of power, which the power supply circuit 240 is required to supply to a peripheral device through the second port 232, to a threshold value set by the controller 299. The controller 299 may control the current limiting circuit 250 to limit the sum of power to be output to the first port 231 and power to be output to the second port 232 within the designated threshold value. In an example, when the sum is set to 4.5 W and when about 3.5 W is output through the first port 231, the current limiting circuit 250 may limit power output to the second port 232 within about 1 W. Although not illustrated, a circuit identical to the current limiting circuit 250 may be formed between any output terminal and a respective port of the power supply circuit 240. For example, a second current limiting circuit may be formed between the output terminal 314b of the fourth adjuster 315 and the first port 231. In accordance with some embodiments, current limiting circuits may be provided between each adjuster 314, 315, 316, 317 and each respective port 231, 232, 233, 234.

The switches 261 and 262 may be formed in the MPA 200 so as to allow the controller 299 to select a subject to perform communication (e.g., PD communication) with the power supply device 201 from among the controller 299 and the host device 202.

According to an embodiment, and referring to FIG. 4B, a first switch 261 may include two terminals 261a and 261b, and may be configured to connect, under control of the controller 299, the first signal pin 220b (e.g., a configuration channel (CC) pin in a plug according to USB Type-C) of the host connection port 220 to one of the two terminals 261a and 261b. A (1-1)th terminal 261a of the two terminals 261a and 261b may be connected to the controller 299, and a (1-2)th terminal 261b may be connected to a second switch 262 through a first connection wire 263. The second switch 262 may include two terminals 262a and 262b, and may be configured to connect, under control of the controller 299, the signal pin 210b (e.g., the CC pin in a plug according to USB Type-C) of the power connection port 210 to one of the two terminals 262a and 262b. Among the two terminals 262a and 262b, the (2-1)th terminal 262a may be connected to the controller 299, and the (2-2)th terminal 262b may be connected to the (1-2)th terminal 261b of the first switch 261 through the first connection wire 263.

The controller 299 may control the first switch 261 and the second switch 262 to connect the (1-2)th terminal 261b, among the two terminals 261a and 261b of the first switch 261, to the first signal pin 220b of the host connection port 220, and connect the (2-2)th terminal 262b, among the two terminals 262a and 262b of the second switch 262, to the signal pin 210b of the power connection port 210. Referring to FIG. 4B, a data line 402 for directly connecting the power supply device 201 to the host device 202 according to the above-mention operation of the controller 299 may be formed in the MPA 200. According to an embodiment, when a peripheral device is not connected to the peripheral device connection port 230, the controller 299 may control the switches 261 and 262 to form the data line 402. According to an embodiment, the host device 202 may perform data communication (e.g., PD communication) with the power supply device 201 through the data line 402 without relay of the controller 299. That is, the data line 402 may bypass the controller 299 along the first connection wire 263. The controller 299 may periodically monitor the data communication between the host device 202 and the power supply device 201. For example, the controller 299 may determine the content of a message exchanged between the power supply device 201 and the host device 202 through a second connection wire 264 electrically coupled to the first connection wire 263. The controller 299 may change the state of the switches 261 and 262, based on the message content. For example, a state in which the first signal pin 220b is connected to the (1-1)th terminal 261a and the signal pin 210b of the power connection port 210 is connected to the (2-1)th terminal 262a may be referred to as a first state (or an indirect connection state), and a state in which the first signal pin 220b is connected to the (1-2)th terminal 261b and the signal pin 210b of the power connection port 210 is connected to the (2-2)th terminal 262b may be referred to as a second state (or a direct connection state). The controller 299 may change, based on the message content, the state of the switches 261 and 262 from the second state to the first state. The second (direct connection) state may be used for fast charging, where the power is supplied directly from the power supply device 201 to the host device 202, and bypasses the controller 299. In accordance with some embodiments, when the determined message content is a message indicating fast charging completion, the controller 299 may change the state of the switches 261 and 262 from the second state to the first state.

The memory 288 may be electrically and operably connected to the controller 299. Various operations of the MPA 200, described later, may be stored as instructions in the memory 288, and may be performed or executed by the controller 299. Data used to execute the instructions may be stored in the memory 288. When the instructions are executed, data generated by the controller 299 or data received from an electronic device (e.g., the power supply device 201 or the host device 202) connected to the MPA 200 may be stored in the memory 288.

It will be appreciated that although the configuration of FIG. 4B does not illustrate the adjusters and ports, illustrated in FIG. 4A, these features may be present in the configuration of FIG. 4B and are not shown for clarity. Similarly, the switches and associated terminals described with respect to FIG. 4B may be present in the configuration of FIG. 4A, but are not shown for simplicity of description of the functionality of the systems shown and described. FIG. 2B illustrates schematically the combination of each of FIGS. 4A and 4B.

Figure 5:
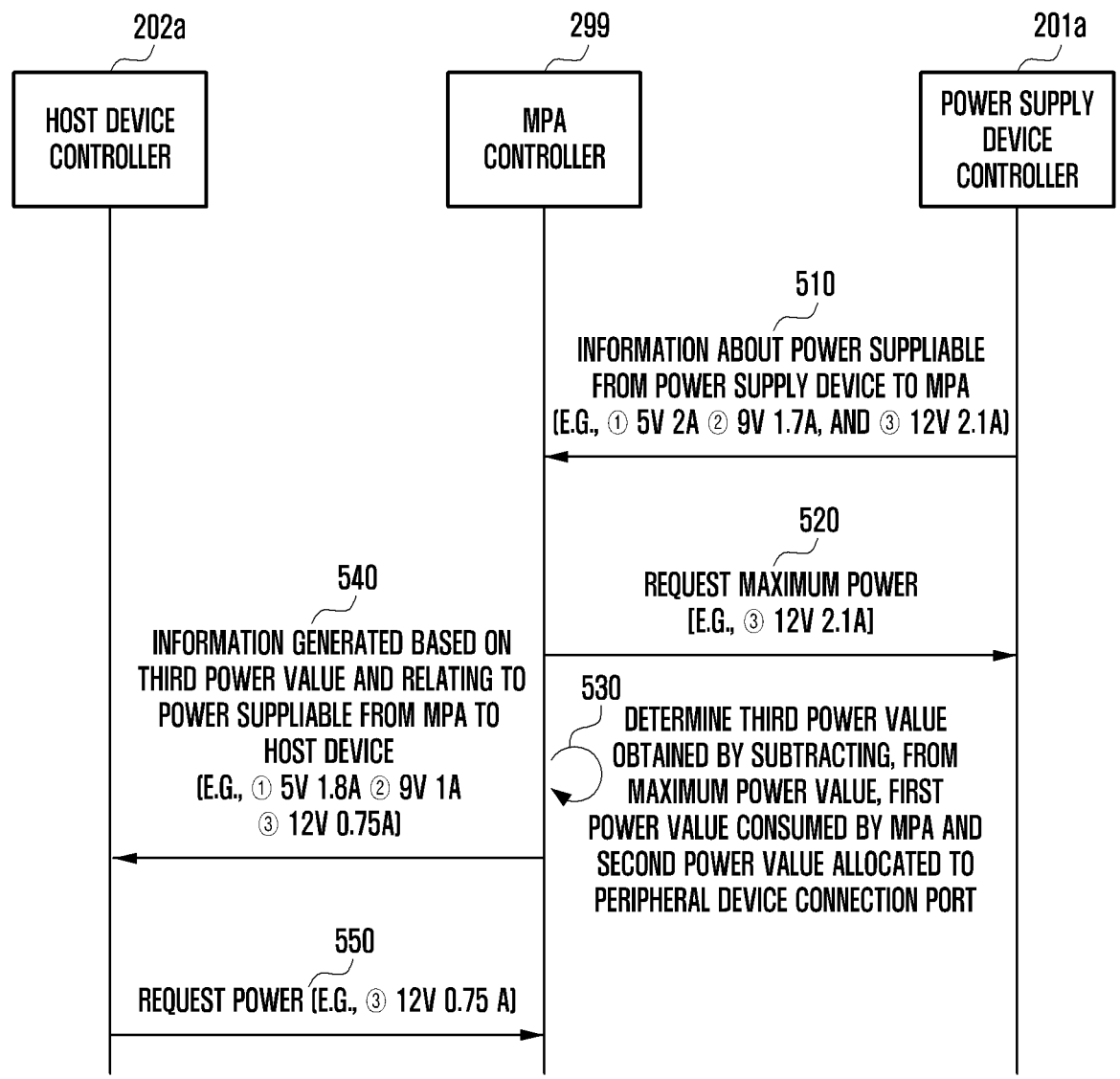
FIG. 5 is a flowchart illustrating operations for supplying power to a host device from a power supply device according to an embodiment through a multiport adapter.

FIG. 5 is a flowchart illustrating operations for supplying power to the host device 202 by the power supply device 201 according to an embodiment through the MPA 200.

In operation 510, the controller 299 of the MPA 200 may receive information about power suppliable from the power supply device 201 to the MPA 200 (hereinafter, first power information) from a controller 201a of the power supply device 201 through the signal pin 210b of the power connection port 210. For example, when the power supply device 201 is connected to the power connection port 210, power may be supplied from the power supply circuit 240 to the controller 299. The controller 299 of the MPA 200 may be awakened by the supplied power, and may transmit a message requesting power information to the controller 201a of the power supply device 201 through the signal pin 210b of the power connection port 210. In response to the request message, the controller 201a of the power supply device 201 may transmit a source capability report to the controller 299 of the MPA 200. For example, voltage values suppliable from the power supply device 201 and current values corresponding to the voltage values, respectively, (e.g., ① 5V 2 A, ② 9V 1.7 A, and ③ 12V 2.1 A) may be transmitted to the controller 299 of the MPA 200 while being included in the source capability report.

In operation 520, the controller 299 of the MPA 200 may determine a maximum power value (e.g., ③ 12V 2.1 A) capable of being supplied by the power supply device 201 in the first power information, and may transmit a message requesting supply of power having the identified maximum power value to the controller 201a of the power supply device 201 through the signal pin 210b.

In operation 530, the MPA controller 299 may determine a third power value obtained by subtracting, from the maximum power value, a first power value consumed by the MPA 200 and a second power value allocated to a peripheral device through the peripheral device connection port 230. For example, the first power value may include a power value consumed for power adjustment in the power supply circuit 240, and a power value lost in a power line of the MPA 200. The second power value may include a maximum power value suppliable to a peripheral device connected to the first port 231, a maximum power value suppliable to a peripheral device connected to the second port 232, a maximum power value suppliable to a peripheral device connected to the third port 233, and a maximum power value suppliable to a peripheral device connected to the fourth port 234. In accordance with some embodiments, a current value supplied from the power supply circuit 240 to the controller 299 may be, for example, serval mA to several tens of mA.

Accordingly, because power consumed by the controller 299 is extremely small compared to power to be supplied to the host device 202, the power consumption of the controller 299 may be negligible or even ignored entirely when calculating the third power value.

In operation 540, the MPA controller 299 may generate, based on the third power value, information about power suppliable from the MPA 200 to the host device 202 (e.g., ① 5V 1.8 A ② 9V 1 A ③ 12V 0.75 A) (hereinafter, second power information), and may transmit the second power information to a controller 202a (e.g., the main processor 121 or the auxiliary processor 123 in FIG. 1) of the host device 202 through a signal pin (e.g., the first signal pin 220b (e.g., the CC pin in a plug according to USB Type-C)) of the host connection port 220. According to an embodiment, the MPA controller 299 may determine maximum power suppliable to the host device 202, and may generate, based on the maximum power, power information of which the host device 202 is notified. For example, when it is determined, in operation 530, that the maximum suppliable power is 9 W, the MPA controller 299 may transmit information indicating that the maximum suppliable power is 9 W (e.g., the second power information) and information that power lower than the same can be supplied (e.g., 5V 1 A) to the controller 202a of the host device 202.

In operation 550, the MPA controller 299 may receive a message requesting power (e.g., ③ 12V 0.75 A) from the controller 202a of the host device 202 in response to transmitting the second power information to the controller 202a of the host device 202. The controller 299 of the MPA 200 may control, based on the request message, the power supply circuit 240 to output the power requested by the controller 202a of the host device 202 to the host device 202 through the power pin 220a of the host connection port 220.

Figure 6:
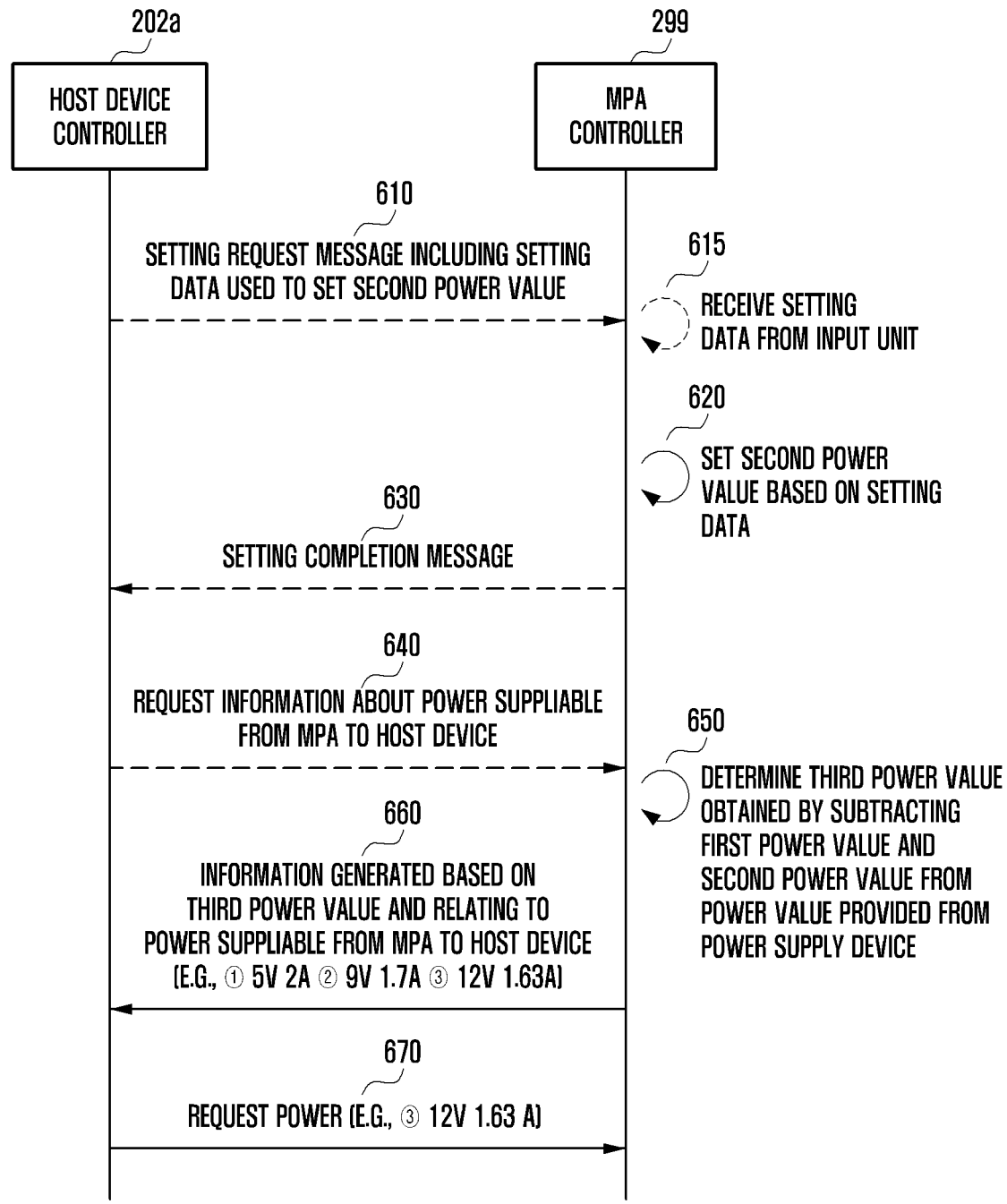
FIG. 6 is a flowchart illustrating operations for supplying power received from a power supply device to a host device by a multiport adapter according to an embodiment.
Figure 7:
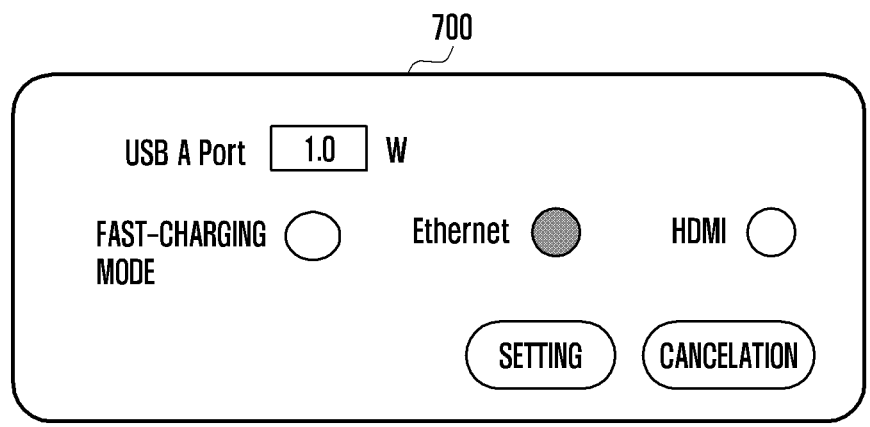
FIG. 7 illustrates a user interface ("UI") screen provided by a host device in order to configure an operation to be performed in a power supply circuit of a multiport adapter according to an embodiment.
Figure 8:
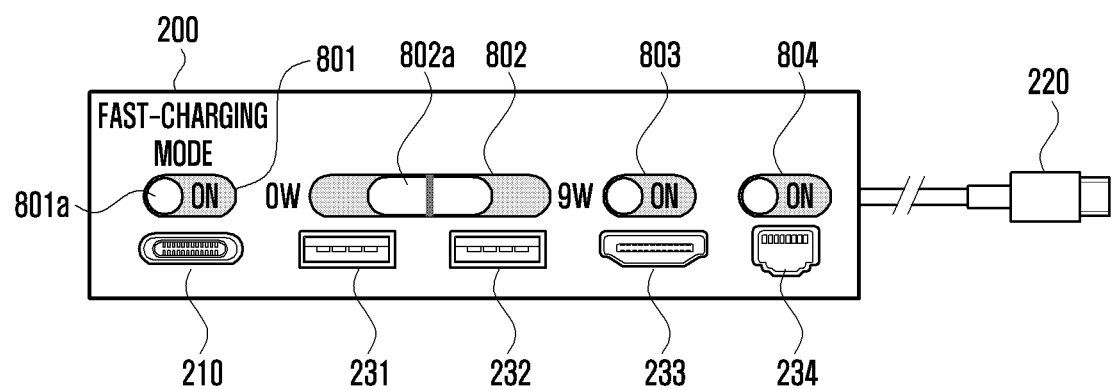
FIG. 8 illustrates the exterior of a multiport adapter according to an embodiment, having an input unit for configuring an operation to be performed in a power supply circuit of the multiport adapter.
Figure 9:
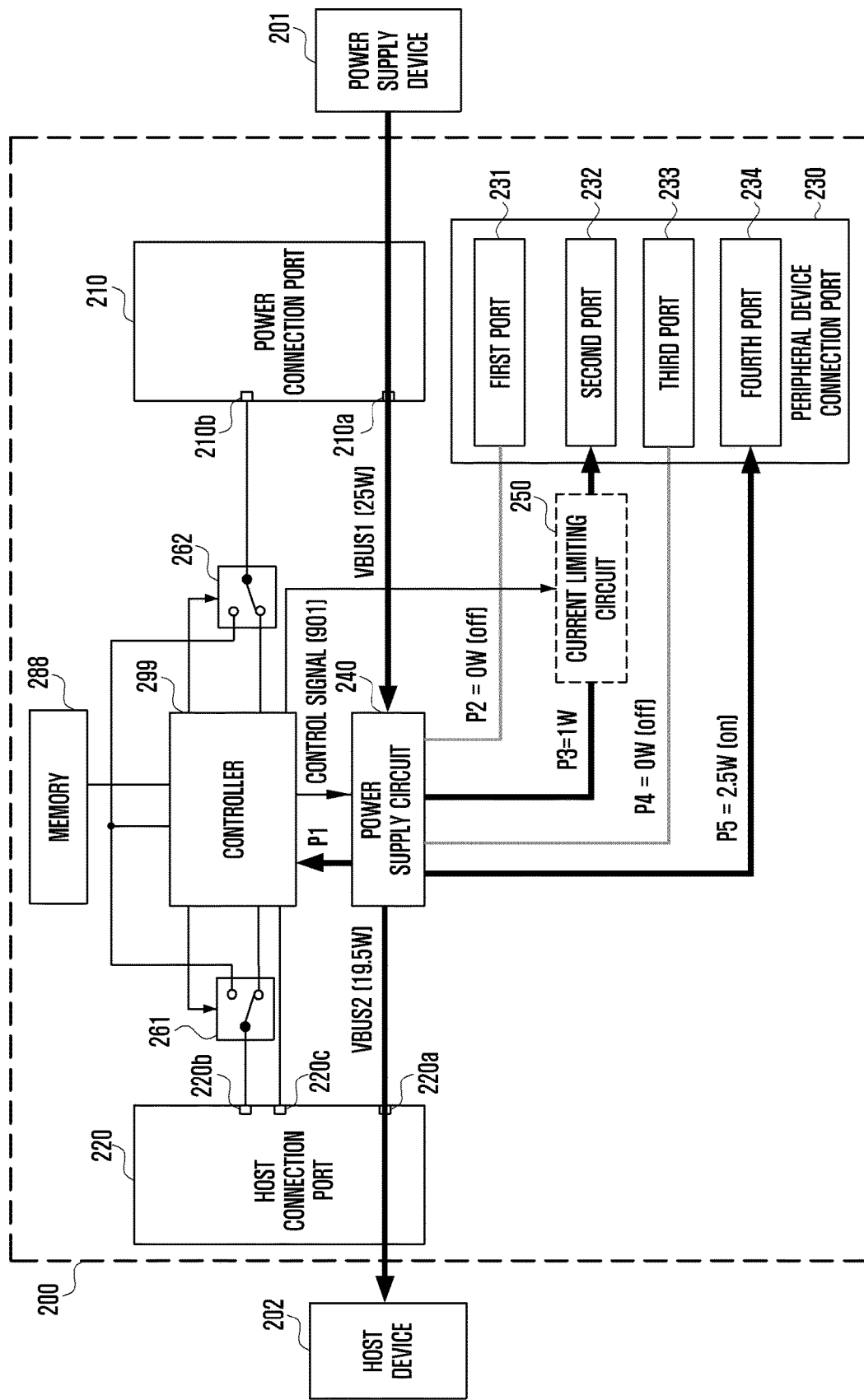
FIG. 9 is a schematic diagram for describing an operation performed in a power supply circuit of a multiport adapter according to an embodiment.

FIG. 6 is a flowchart illustrating operations for supplying power received from the power supply device 201 to the host device 202 by the MPA 200 according to an embodiment. The operations in FIG. 6 may be performed after operation 550 in FIG. 5 is performed. FIG. 7 illustrates a user interface ("UI") screen 700 provided by the host device 202 in order to configure an operation to be performed in the power supply circuit 240 of the MPA 200 according to an embodiment. FIG. 8 illustrates the exterior of the MPA 200 according to an embodiment, having input units 801, 802, 803, 804 for configuring an operation to be performed in the power supply circuit 240 of the MPA 200. FIG. 9 is a schematic diagram for describing an operation performed in the power supply circuit 240 of the MPA 200.

In operation 610, the MPA controller 299 may receive a setting request message, which includes setting data used to set a second power value to be supplied to a peripheral device through the peripheral device connection port 230, from the controller 202a (e.g., the processor 102 in FIG. 1) of the host device 202 through the first signal pin 220b (e.g., the CC pin) or the second signal pin 220c (e.g., an SBU pin) of the host connection port 220.

According to an embodiment, the controller 202a (e.g., the processor 102 in FIG. 1) of the host device 202 may display the UI screen 700 in FIG. 7, on which a user can set the second power value, on a display (e.g., the display module 160 in FIG. 1). The controller 202a of the host device 202 may transmit the setting request message including the setting data, which has been input through the UI screen 700, to the controller 299 of the MPA 200 through the first signal pin 220b or the second signal pin 220c of the host connection port 220.

According to an embodiment, the controller 202a of the host device 202 may determine an operation mode of the host device 202. As a result of the determination, when the operation mode is set to an idle mode or a sleep mode (or an inactive mode), the controller 202a may transmit a setting request message, which requests that the MPA 200 be set to a fast-charging mode, to the controller 299 of the MPA 200 through the first signal pin 220b or the second signal pin 220c of the host connection port 220. For example, the setting request message may include setting data having a format of "fast-charging mode=On". The idle mode may be defined as a state in which supply of power to a system (e.g., the main processor 121 in FIG. 1) of the host device 202 is stopped (e.g., a power-off mode), or a sleep mode (in other words, a battery saving mode) for extending battery use time. Thus, during the idle mode, work using a peripheral device may not be performed, and accordingly, the setting data having the format may be transmitted to the MPA controller 299. When the host device 202 is released from the idle mode and switches to an active mode, the controller 202a of the host device 202 may transmit a setting request message requesting release of the fast-charging mode to the controller 299 of the MPA 200 through the first signal pin 220b or the second signal pin 220c of the host connection port 220. For example, the setting request message may include setting data having a format of "fast-charging mode=Off".

Before transmitting the setting request message to the controller 299 of the MPA 200, the controller 202a of the host device 202 may determine, based on identification information (e.g., vender identification (ID) or product ID) of the MPA 200, whether the MPA 200 is an adapter having a power adjustment function. When it is determined that the MPA 200 is an adapter having a power adjustment function, the controller 202a of the host device 202 may transmit the setting request message to the controller 299 of the MPA 200 through the second signal pin 220c. Here, the identification information of the MPA 200 may be sent to the controller 202a of the host device 202 before the controller 299 of the MPA 200 transmits the second power information to the controller 202a of the host device 202 in operation 540, or together with the second power information.

In operation 615, instead of receiving the setting data from the controller 202a of the host device 202, the controller 299 of the MPA 200 may receive setting data used to set the second power value through input units 801, 802, 803, 804 of the MPA 200, as illustrated in FIG. 8. In some embodiments, setting data may be received from both the controller 299 and the input units 801-804.

In operation 620, the MPA controller 299 may set the second power value, based on the setting data resulting from performing of operation 610 and/or operation 615, and may store the setting data in the memory 288 together with the set second power value.

According to an embodiment, the setting request message, which the controller 202a of the host device 202 has transmitted to the controller 299 of the MPA 200, may include a setting data having a format of "Set PWR USB A Port=1.0 W, H (HDMI)=off, E (ethernet)=On, fast-charging mode=Off", provided from input data that the user has input into the host device 202 through the UI screen 700. The controller 299 of the MPA 200 may determine a value related to the fast-charging mode in the setting data of the format, and, when the determined value corresponds to "Off", may set the second power value, based on another value of the setting data. When the determined value corresponds to "On", the controller 299 of the MPA 200 may set all of the peripheral device connection ports 230 to an inactive state regardless of the other values (that is, may set the second power value to "0"). The controller 299 of the MPA 200 may determine USB A Port=1.0 W in the setting data of the format, and may set, to 1 W, a maximum power value suppliable to a peripheral device connected to the second port 232. The controller 299 of the MPA 200 may determine H=off in the setting data of the format, and accordingly, may set the state of the third port 233 to an inactive state. Therefore, power may not be output to the third port 233. The controller 299 of the MPA 200 may determine E=On included in the setting data of the format, and may set the state of the fourth port 234 to an active state. Therefore, a maximum power value capable of being output from the fourth port 234 to the outside may be a designated default value (e.g., 2.5 W). In some embodiments, the first port (e.g., USB Hub) 231 is dependent on the setting of the second port 232 and/or the third port 233. For example, when E is set to On in the setting data of the format, the controller 299 of the MPA 200 may set the state of the first port 231 to an active state. In the state in which the first port 231 is in an activated state, a maximum power value suppliable from the first port 231 to a peripheral device may be set to, for example, 2 W. When E is set to Off in the setting data of the format, the controller 299 of the MPA 200 may set the state of the first port 231 to an inactive state.

According to an embodiment, a first input unit 801 in FIG. 8 may be implemented as a slide switch as illustrated (e.g., mechanical/physical switch, or digital touch-based switch). As illustrated, the controller 299 of the MPA 200 may receive a first input signal indicating that a manipulation lever 801a of the first input unit 801 is positioned on the left or a second input signal indicating that the manipulation lever 801a is positioned on the right. When the first input signal is received from the first input unit 801, the controller 299 of the MPA 200 may set the MPA 200 to a fast-charging mode (or a direct connection mode). For example, the controller 299 of the MPA 200 may set all of the peripheral device connection ports 230 to an inactive state (that is, may set the second power value to "0"). When the second input signal is received from the first input unit 801, the controller 299 of the MPA 200 may set the MPA 200 in a normal charging mode (or an indirect connection mode), and may determine a value received from another input unit. The controller 299 of the MPA 200 may set, based on a value received from a second input unit 802, maximum power values of the first port 231 and the second port 232. For example, as illustrated, the second input unit 802 may be implemented as a slide switch (e.g., mechanical/physical switch, or digital touch-based switch). As illustrated, the slide switch of the second input unit 802 may provide a sliding scale that allows for many control of a power output. In this non-limiting embodiment, the slide switch of the second input unit 802 may provide a range between 0 W and 9 W, and a manipulation lever 802a can be moved along the slide switch to set a maximum power suppliable from the MPA 200. For example, when the manipulation lever 802a is positioned at a center position of the slide switch (as illustrated), the controller 299 of the MPA 200 may set the maximum power value suppliable through all of the first port 231 and the second port 232 to 4.5 W (e.g., half of a maximum value). When the manipulation lever 802a is positioned on the left (e.g., lowest possible value, and 0W in this embodiment), the controller 299 of the MPA 200 may set the first port 231 and the second port 232 to an inactive state. When the manipulation lever 802a is positioned on the right (e.g., highest possible value or maximum value, and 9 W in this embodiment), the controller 299 of the MPA 200 may set the maximum power value suppliable through all of the first port 231 and the second port 232 to 9 W. A third input unit 803 and a fourth input unit 804 may be implemented as slide switches which are the same or similar as the first input unit 801 (e.g., "on" state and "off" state). For example, the controller 299 of the MPA 200 may set the third port 233 to an active state when the first input signal is received from the third input unit 803, and may set the third port 233 to an inactive state when the second input signal is received from the third input unit 803. Similarly, the controller 299 of the MPA 200 may set the fourth port 234 to an active state when the first input signal is received from the fourth input unit 804, and may set the fourth port 234 to an inactive state when the second input signal is received from the fourth input unit 804.

In operation 630, the controller 299 of the MPA 200 may transmit a message indicating that setting of the second power value is completed to the controller 202a of the host device 202 through the first signal pin 220b or the second signal pin 220c of the host connection port 220.

In operation 640, the controller 299 of the MPA 200 may receive a message from the controller 202a of the host device 202, which requests provision of information about power suppliable from the MPA 200 to the host device 202 in response to the setting completion message (operation 630), from the controller 202a of the host device through the first signal pin 220b or the second signal pin 220c the host connection port 220.

In operation 650, the controller 299 of the MPA 200 may determine a third power value obtained by subtracting a first power value and the second power value set in operation 620 from a power value provided by the power supply device 201. For example, as discussed above, power P1 used by the controller 299 may be negligible or even ignored when calculating the third power value. According to setting based on the data which the user has input into the host device 202 through the UI screen 700, the second power value, which is the sum of P2 (e.g., =0 W) allocated to the first port 231, P3 (e.g., =1 W) allocated to the second port 232, P4 (e.g., =0 W) allocated to the third port 233, and P5 (e.g., =2.5 W) allocated to the fourth port 234, is, for example, 3.5 W. In such an embodiment, the first power value consumed by the MPA 200 is 2 W. 19.5 W, which remains after subtracting 5.5 W (=the second power value (3.5 W)+ the first power value (2 W)) from 25 W (VBUS1) provided by the power supply device 201, may be determined to be the third power value.

In operation 660, the controller 299 of the MPA 200 may generate, based on the third power value, information about power suppliable from the MPA 200 to the host device 202 (e.g., ① 5V 2 A ② 9V 1.7 A ③ 12V 1.63 A), and may transmit the generated power information to the controller 202a of the host device 202 through a signal pin (e.g., the first signal pin 220b) of the host connection port 220. In some embodiments, operation 630 and operation 640 may be omitted. For example, in some embodiments, in response to the setting request message (operation 610), the controller 299 of the MPA 200 may also perform operations 650 and 660 without performing operations 630 and 640.

In operation 670, the controller 299 of the MPA 200 may receive a message requesting power (e.g., ③ 12V 1.63 A) from the controller 202a of the host device 202 in response to the transmission of the power information to the controller 202a of the host device 202 (operation 660). The controller 299 of the MPA 200 may control, based on the request message (operation 670), the power supply circuit 240 to output the power requested by the controller 202a of the host device 202 to the host device 202 through the power pin 220a of the host connection port 220.

Referring to FIG. 9, the controller 299 may output a control signal 901 to the power supply circuit 240, based on setting data used to set the second power value. In response to the control signal 901, the power supply circuit 240 may divide VBUS1 into VBUS2, P2, P3, P4, and P5 and output VBUS2, P2, P3, P4, and P5.

According to the embodiment, the second power value may be set based on the setting data received from the input units 801-804 or the host device 202, but the disclosure is not limited thereto. According to another embodiment, the controller 299 of the MPA 200 may also set the second power value, based on whether a peripheral device is connected to the peripheral device connection port 230. For example, the controller 299 of the MPA 200 may set a port, to which a peripheral device is connected among the ports 231-234, to an active state, and may set a port, to which a peripheral device is not connected, to an inactive state. The controller 299 of the MPA 200 may set the second power value, based on the set state set of each port of the peripheral device connection port 230. When all of the ports 231-234 are in an inactive state, the controller 299 of the MPA 200 may set the MPA 200 to a fast-charging mode.

Figure 10:
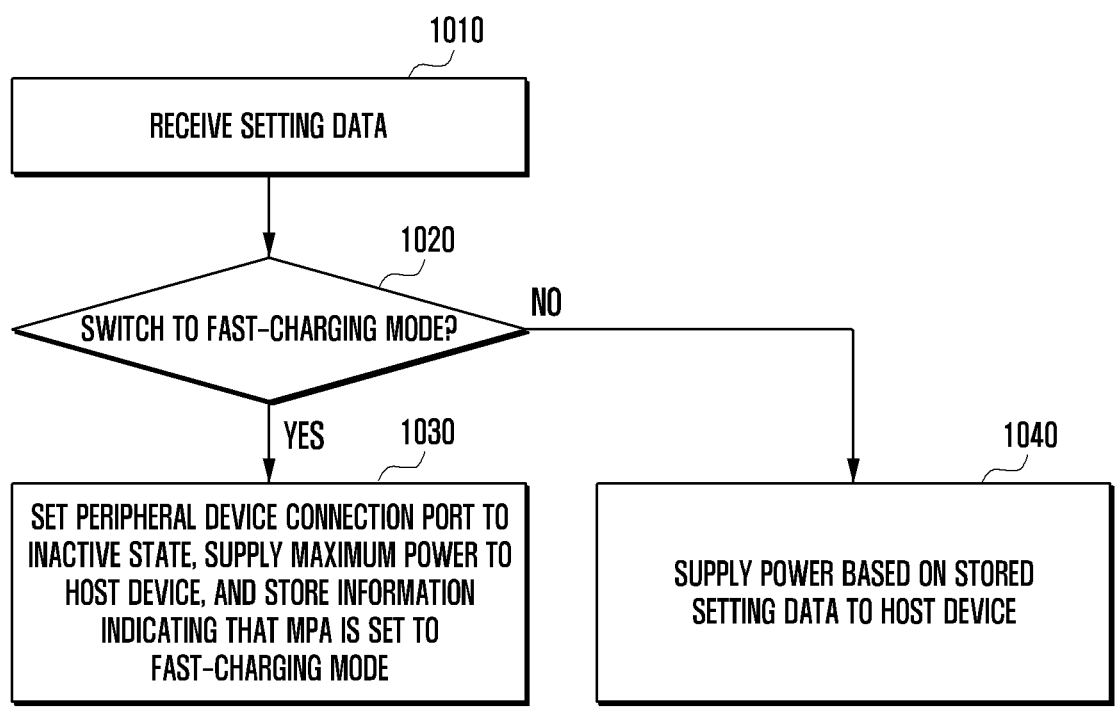
FIG. 10 is a flowchart illustrating operations for switching a charging mode from a normal charging mode to a fast-charging mode in a multiport adapter according to an embodiment.

FIG. 10 is a flowchart illustrating operations for switching a charging mode from a normal charging mode to a fast-charging mode in the MPA 200 according to an embodiment. In accordance with some embodiments, the operations in FIG. 10 may be performed after operation 550 in FIG. 5 or operation 670 in FIG. 6 is performed.

In operation 1010, the controller 299 of the MPA 200 may receive, from the input units 801-804 and/or the host device 202, setting data used to set a third power value to be supplied to the host device 202 and a second power value supplied to one or more peripheral devices through the peripheral device connection port 230.

In operation 1020, the controller 299 of the MPA 200 may store the received setting data in the memory 288, and may determine, based on the stored setting data, whether the charging mode of the MPA 200 needs to switch from a normal charging mode (or an indirect connection mode) to a fast-charging mode (or a direct connection mode).

When switching from the normal charging mode to the fast-charging mode is determined in the setting data (operation 1020, Yes), in operation 1030, the MPA controller 299 may set all of the peripheral device connection ports 230 to an inactive state, and may control the power supply circuit 240 to supply maximum power (e.g., all of power other than power consumed by the MPA 200) to the host device 202. The controller 299 of the MPA 200 may store, in the memory 288, information (e.g., flag) indicating that the MPA 200 is set to a fast-charging mode.

As a result of the setting data determination, when there is no need to switch to the fast-charging mode (operation 1020, No), in operation 1040, the controller 299 of the MPA 200 may calculate, based on the stored setting data, power (e.g., VBUS2 in FIG. 9) to be supplied to the host device 202, and may control the power supply circuit 240 to supply the calculated power to the host device 202.

Figure 11:
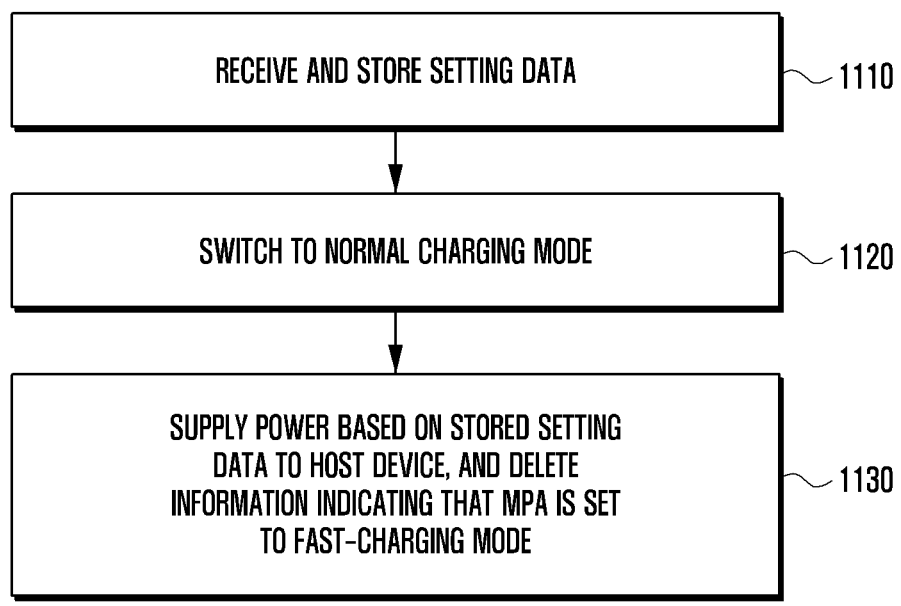
FIG. 11 is a flowchart illustrating operations for switching a charging mode from a fast-charging mode to a normal charging mode in a multiport adapter according to an embodiment.

FIG. 11 is a flowchart illustrating operations for switching a charging mode from a fast-charging mode to a normal charging mode in the MPA 200 according to an embodiment. The operations in FIG. 11 may be performed after operation 1030 in FIG. 10 is performed.

In operation 1110, the controller 299 of the MPA 200 may receive, from the input units 801-804 and/or the host device 202, setting data used to set a third power value to be supplied to the host device 202 and a second power value supplied to be to one or more peripheral devices through the peripheral device connection port 230.

In operation 1120, the controller 299 of the MPA 200 may store the received setting data in the memory 288, and may determine, based on the stored setting data, that there is a need to switch the charging mode of the MPA 200 from a fast-charging mode to a normal charging mode. For example, the controller 299 of the MPA 200 may determine, in the stored setting data, that there is a need to switch from the fast-charging mode to the normal charging mode.

In operation 1130, the controller 299 of the MPA 200 may calculate, based on the setting data stored in the memory 288, power (e.g., VBUS2 in FIG. 9) to be supplied to the host device 202, and may control the power supply circuit 240 to supply the calculated power to the host device 202. The controller 299 of the MPA 200 may delete, from the memory 288, information indicating that the MPA 200 is set to the fast-charging mode (e.g., information recorded in the process of performing operation 1030).

Figure 12:
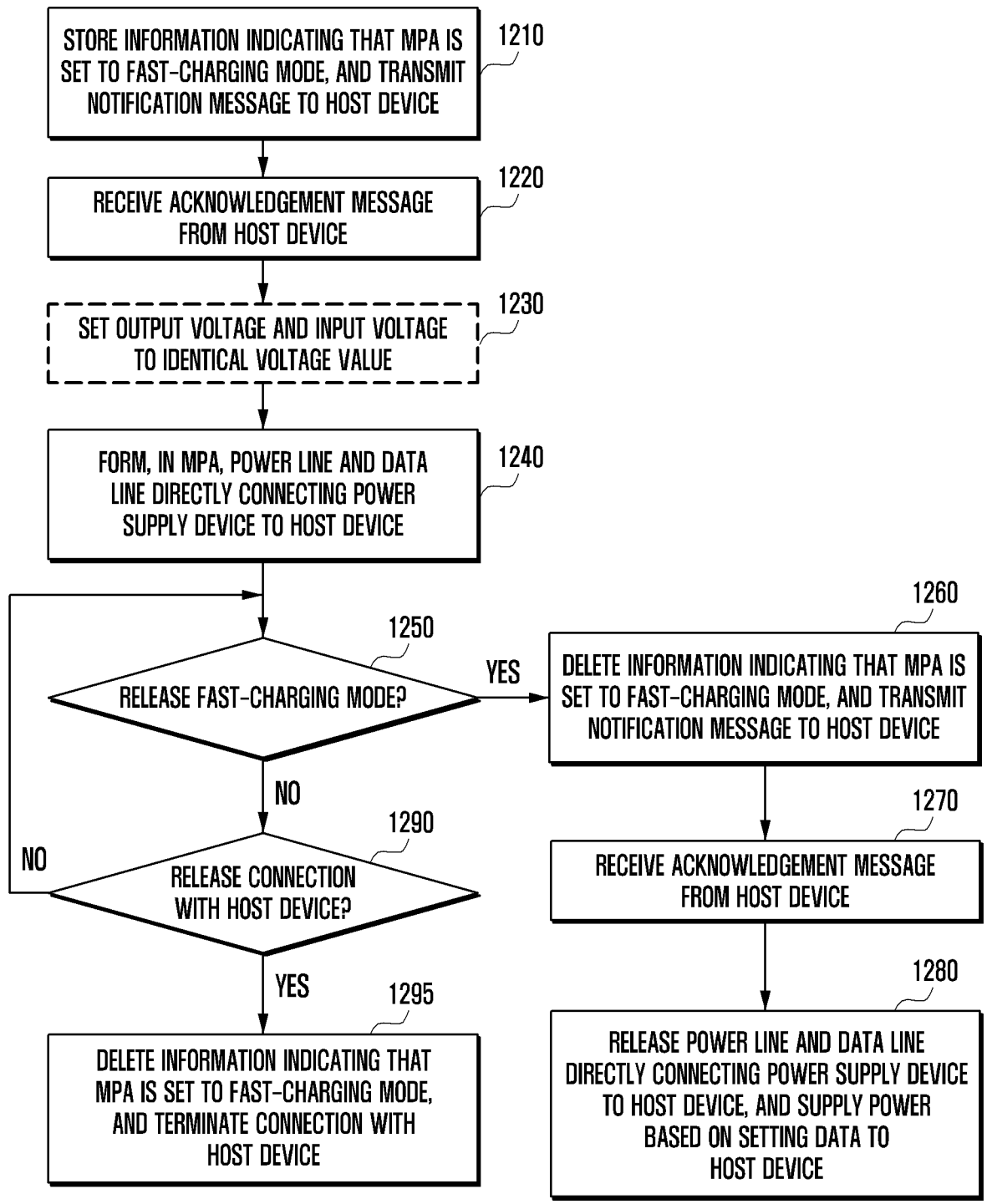
FIG. 12 is a flowchart illustrating operations for supplying power received from a power supply device to a host device by a multiport adapter according to an embodiment.

FIG. 12 is a flowchart illustrating operations for supplying power received from the power supply device 201 to the host device 202 by the MPA 200 according to an embodiment.

The controller 299 of the MPA 200 may perform the operations in FIG. 12, based on setting the MPA 200 to a fast-charging mode (e.g., switching of a mode from a normal charging mode to the fast-charging mode). The controller 299 of the MPA 200 may perform PD communication with the controller 201a of the power supply device 201 through the signal pin 210b of the power connection port 210 to determine whether the power supply device 201 is a model supporting a power adjustment function (e.g., PPS). The controller 299 of the MPA 200 may perform the operations in FIG. 12, further based on determining that the power supply device 201 is a model having a power adjustment function. The controller 299 of the MPA 200 may determine the version of a protocol for PD communication, which the host device 202 has, through the signal pin 220b or 220c of the host connection port 220. The controller 299 of the MPA 200 may determine the version of a protocol for PD communication, which the power supply device 201 has, through the signal pin 210b of the power connection port 210. In some embodiments, the controller 299 of the MPA 200 may perform the operations in FIG. 12, further based on a fact that the versions of protocols of two devices (e.g., the power supply device 201 and the host device 202) are equal to or higher than the version of a protocol which the MPA 200 has.

In operation 1210, the controller 299 of the MPA 200 may store, in the memory 288, information (e.g., flag) indicating that the MPA 200 is set to a fast-charging mode, and may transmit, to the controller 202a of the host device 202, a notification message indicating that the MPA 200 will be set to a fast-charging mode.

In operation 1220, the controller 299 of the MPA 200 may receive an acknowledgement message for the notification message from the controller 202a of the host device 202.

In operation 1230, in response to the acknowledgement message, the controller 299 of the MPA 200 may set, to an identical voltage value, a voltage of power received from the power supply device 201 through the power pin 210a of the power connection port 210 (hereinafter, input voltage) and a voltage of power transmitted to the host device 202 through the power pin 220a of the host connection port 220 (hereinafter, output voltage). For example, the input voltage may be different from the output voltage. Therefore, before operation 1240 for direct connection between the power supply device 201 and the host device 202, the controller 299 of the MPA 200 may transmit a message, which requests the input voltage to be changed to a designated voltage value (or a default value (e.g., 5V)), to the power supply device 201 through the signal pin 210b of the power connection port 210. The controller 299 of the MPA 200 may transmit a message, which requests the output voltage to be changed to the voltage value, to the host device 202 through the signal pin 220b or 220c of the host connection port 220. Operation 1230 may be omitted if the input and output voltages are already equal.

In operation 1240, the controller 299 of the MPA 200 may control the power supply circuit 240 and the switches 261 and 262 to form, in the MPA 200, a path (e.g., the power line 401 in FIG. 4A and the data line 402 in FIG. 4B) directly connecting the power supply device 201 to the host device 202. The host device 202 may perform PD communication with the power supply device 201 through the data line 402 to set the input voltage and the output voltage to the same value. Accordingly, in some embodiments, operation 1230 may be omitted, and the controller 299 of the MPA 200 may perform operation 1240 in response to the reception of the acknowledgement message (operation 1220).

When the power supply circuit 240 performs an operation for forming the power line 401, a supply of power from the power supply device 201 to the controller 299 of the MPA 200 through the power supply circuit 240 may be temporarily cut off. When the temporary cutting-off occurs, the capacitor 330 may supply stored power to the controller 299.

When the switches 261 and 262 operate to form the data line 402, the controller 202a of the host device 202 may recognize that the MPA 200 is disconnected from the host device 202 and the power supply device 201 is connected to the host device 202. In order to enable the host device 202 to recognize that the connection between the MPA 200 and the host device 202 is not actually released (that is, the MPA 200 is actually connected to the host device 202), the controller 299 of the MPA 200 may transmit, before performing operation 1240, a notification message to the controller 202a of the host device 202 as described above. The controller 202a of the host device 202 may recognize, through the notification message, that the MPA 200 is continuously connected to the host device 202. The host device 202 may be directly connected to the power supply device 201 through the power line 401 and the data line 402. As the data line 402 in FIG. 4B is formed in the MPA 200, the connection between the controller 299 of the MPA 200 and the controller 202a of the host device 202 through the first signal pin 220b may be released. Accordingly, the controller 202a of the host device 202 may misrecognize that the connection between the MPA 200 and the host device 202 has been released. In order to avoid the misrecognition, the controller 299 of the MPA 200 may periodically communicate with the controller 202a of the host device 202 through the second signal pin 220c to notify the controller 202a of the host device 202 of the presence of the MPA 200.

In operation 1250, the controller 299 of the MPA 200 may determine whether an event for releasing the fast-charging mode of the host device 202 has occurred. For example, the controller 299 of the MPA 200 may receive a message for releasing the fast-charging mode (e.g., a setting message including "fast-charging mode=Off" or a message which relates to an operation of the switch 261, 262, 321, or 322 and changes electrical paths of the power line 401 and the data line 402) from the controller 202a of the host device 202 through the second signal pin 220c or the second connection wire 264. According to an embodiment, the controller 299 of the MPA 200 may receive a second input signal corresponding to the release event from the first input unit 801. In some embodiments, and as an example of an event to trigger a release, the controller 299 of the MPA 200 may detect that a peripheral device is connected to the peripheral device connection port 230, and may recognize the peripheral device connection as the occurrence of the release event.

When the fast-charging mode release event occurs (operation 1250, Yes), in operation 1260, the controller 299 of the MPA 200 may delete, from the memory 288, the information indicating that the MPA 200 is set to the fast-charging mode, and transmit, to the controller 202a of the host device 202, a notification message indicating that the fast-charging mode will be released in the MPA 200.

In operation 1270, the controller 299 of the MPA 200 may receive an acknowledgement message in response to the notification message from the controller 202a of the host device 202.

In operation 1280, the controller 299 of the MPA 200 may control the power supply circuit 240 and the switches 261 and 262 to release the power line 401 and the data line 402 from the MPA 200. For example, the controller 299 of the MPA 200 may connect the signal pin 210b of the power connection port 210 to the (2-1)th terminal 262a of the second switch 262, and may connect the first signal pin 220b of the host connection port 220 to the (1-1)th terminal 261a of the first switch 261. The controller 299 of the MPA 200 may open the switches 321 and 322 of the power supply circuit 240. Furthermore, the controller 299 of the MPA 200 may calculate power, based on setting data (e.g., the setting data stored in the memory 288) used when the MPA 200 is set to a normal charging mode, and may control the power supply circuit 240 to supply the calculated power to the host device 202.

When the fast-charging mode release event does not occur (operation 1250, No), in operation 1290, the controller 299 of the MPA 200 may determine whether an event indicating that a connection between the host device 202 and the MPA 200 has been released has occurred. For example, the controller 299 of MPA 200 may determine, through the second signal pin 220c, whether the host device 202 is present, and, when a signal (e.g., a designated voltage value) indicating the presence of the host device 202 is not received from the second signal pin 220c, may determine that a connection release event has occurred.

When the connection release event occurs (operation 1290, Yes), in operation 1295, the controller 299 of the MPA 200 may delete, from the memory 288, the information indicating that the MPA 200 is set to the fast-charging mode, and may terminate the connection with the host device 202. Additionally, the MPA controller 299 may change a setting for power supply to a default value stored in the memory 288. Additionally, the controller 299 of the MPA 200 may control the power supply circuit 240 and the switches 261 and 262 to release the power line 401 and the data line 402 from the MPA 200. As illustrated, in the event of no release (operation 1290, No), the MPA controller 299 will return to operation 1250.

According to an embodiment, by forming the power line 401 and the data line 402 in the MPA 200, a second method for transferring power through the MPA 200 without the power line 401 and the data line 402 may be more effective in fast-charging than a first method for directly transferring power from the power supply device 201 to the host device 202. Accordingly, the controller 299 of the MPA 200 may compare the power of VBUS2 when the MPA 200 operates in the first method with the power of VBUS2 when the MPA 200 operates in the second method. The controller 299 of the MPA 200 may determine that the method having a higher power as a result of the comparison is a method for supplying power to the host device 202.

Figure 13:
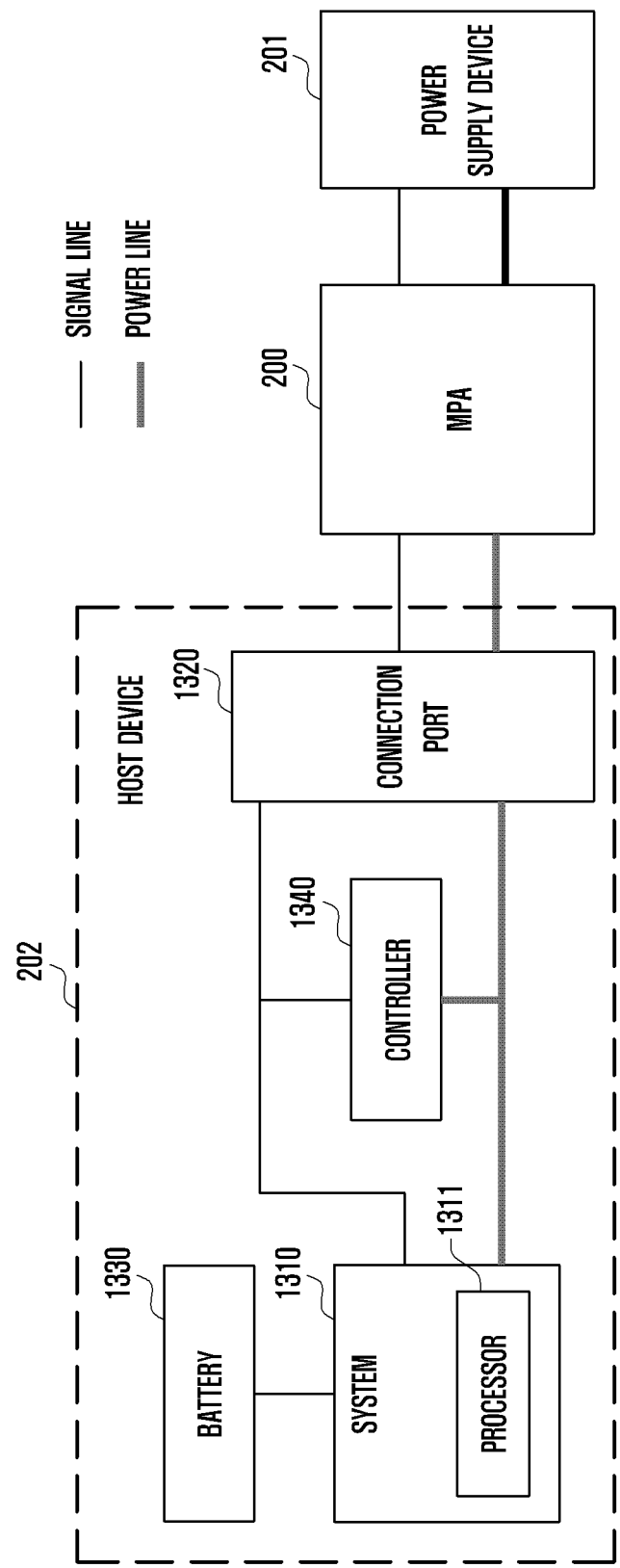
FIG. 13 is an electrical block diagram of a host device according to an embodiment.
Figure 14:
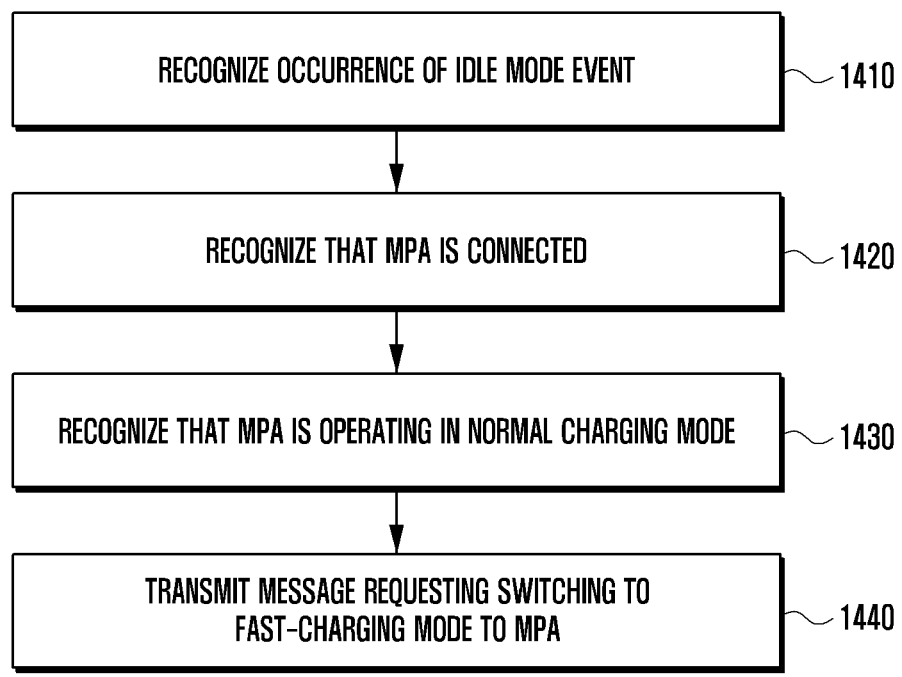
FIG. 14 is a flowchart illustrating operations of a host device controller when a system of a host device according to an embodiment is in an idle mode.

FIG. 13 is an electrical block diagram of the host device 202 according to an embodiment, having a host device controller 1340. FIG. 14 is a flowchart illustrating operations of the host device controller 1340 when a system 1310 of the host device 202, according to an embodiment, is in an idle mode. As shown in FIG. 13, the host device 202 may include the controller 1340, the system 1310 having a processor 1311, a battery 1330, and a connection port 1320. FIG. 13 illustratively shows the host device 202 connected to an MPA 200 and a power supply device 201 by both a signal line and a power line.

Referring to FIGS. 13 and 14, in operation 1410, the controller 1340 (e.g., the auxiliary processor 123 in FIG. 1) may recognize that an idle mode event has occurred. For example, the system 1310 may include the processor 1311 (e.g., the main processor 121 in FIG. 1) to perform the detection of the idle mode event. Although not illustrated, the system 1310 may further include a memory (e.g., the memory 130 in FIG. 1), a PMIC (e.g., the power management module 188 in FIG. 1) (or a MICOM), and an input/output interface (e.g., the input module 150 and the display module 160 in FIG. 1). In the system 1310, the PMIC may control charging of the battery 1330 by using power supplied from the outside (e.g., the power supply device 201). The system 1310 may be driven by power supplied by the battery 1330. The controller 1340 may be driven using power supplied from an external device (e.g., power supply device 201) through a connection port 1320. When the system 1310 operates in a sleep mode or enters a power-off mode in which supply of power from the battery 1330 to the system 1310 is stopped, the PMIC may notify the controller 1340 that the system 1310 switches to an idle mode, through for example a signal line (e.g., inter-integrated circuit (I2C)) or a general-purpose input/output (GPIO) of the PMIC. The controller 1340 may recognize the notification as an idle mode event.

In operation 1420, from identification information (e.g., VID or PID) received through a signal line of the connection port 1320, the controller 1340 may recognize that an external device connected to the host device 202 through the connection port 1320 is the MPA 200.

In operation 1430, the controller 1340 may recognize, from setting data (e.g., "fast-charging mode=Off") transmitted from the host device 202 to the MPA 200 in order to set the MPA 200 or a notification message (e.g., the notification message in operation 1260) received from the MPA 200, that the MPA 200 is operating in a normal charging mode.

As described above, when it is determined that the system 1310 is in the idle mode and that the MPA 200 connected to the host device 202 is operating in the normal charging mode, in operation 1440, the controller 1340 may transmit a message, which requests switching of the MPA 200 to the fast-charging mode, to the MPA 200 through the connection port 1320.

Figure 15:
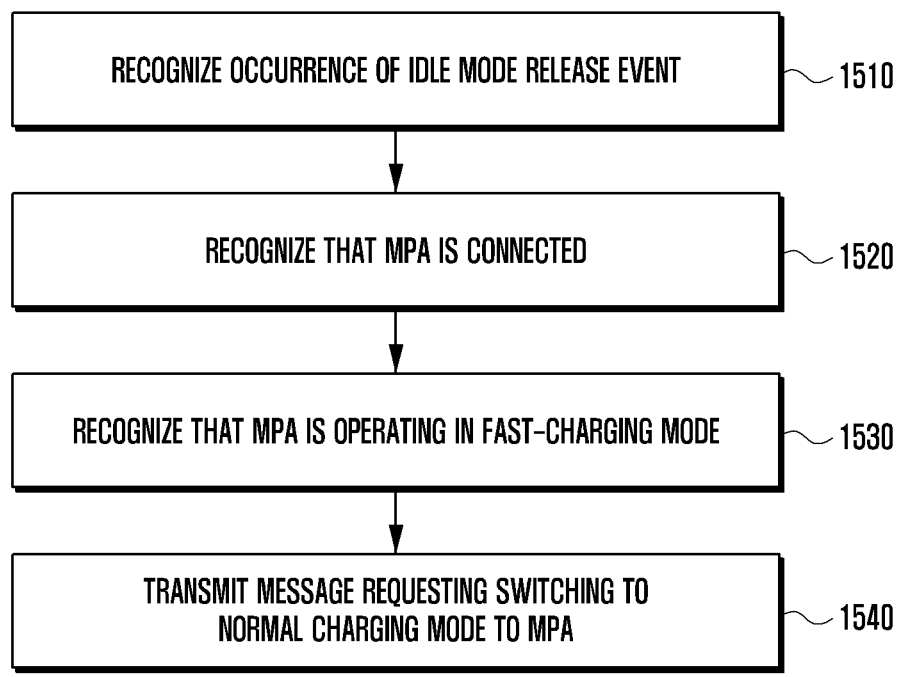
FIG. 15 is a flowchart illustrating operations of a host device controller when an idle mode according to an embodiment is released.

FIG. 15 is a flowchart illustrating operations of the host device controller 1340 when an idle mode according to an embodiment is released.

Referring to FIGS. 13 and 15, in operation 1510, the controller 1340 may recognize that an idle mode is released. For example, when the system 1310 is operating, the PMIC may notify the controller 1340 that the system 1310 is awake, through for example a signal line (e.g., I2C) or a GPIO of the PMIC. The controller 1340 may recognize the notification as idle mode release.

In operation 1520, from identification information (e.g., VID or PID) received through a signal line of the connection port 1320, the controller 1340 may recognize that an external device connected to the host device 202 through the connection port 1320 is the MPA 200.

In operation 1530, the controller 1340 may recognize, from setting data (e.g., "fast-charging mode=On") transmitted from the host device 202 to the MPA 200 in order to set the MPA 200 or a notification message (e.g., the notification message in operation 1210) received from the MPA 200, that the MPA 200 is operating in a fast-charging mode.

As described above, it is determined that the system 1310 is released from the idle mode and that the MPA 200 connected to the host device 202 is operating in the fast-charging mode, in operation 1540, the controller 1340 may transmit a message that requests releasing the fast-charging mode and switching to a normal charging mode (e.g., a setting request message including "fast-charging mode=Off") to the MPA 200 through the connection port 1320.

In an embodiment, a multiport adapter (e.g., 200 in FIGS. 2A and 2B) may include: a power connection port connectable to a power supply device; a host connection port connectable to a host device; a peripheral device connection port connectable to a peripheral device; a controller electrically connected to the power connection port, the host connection port, and the peripheral device connection port; and a power supply circuit configured to receive power from the power supply device through the power connection port, divide the received power, and output the divided power to the host connection port, the peripheral device connection port, and the controller. The controller (e.g., 299 in FIG. 2B) may be configured to receive, through the power connection port, first power information about power suppliable from the power supply device to the multiport adapter, determine a maximum power value in the first power information and transmit a message, which requests the power supply device to supply power of the maximum power value to the multiport adapter, to the power supply device through the power connection port, determine a third power value obtained by subtracting, from the maximum power value, a first power value consumed by the multiport adapter and a second power value set to be supplied to the peripheral device through the peripheral device connection port, generate, based on the third power value, second power information about power suppliable from the multiport adapter to the host device, and transmit the second power information to the host device through the host connection port.

The controller may be configured to receive setting data used to set the second power value from the host device through the host connection port or from an input unit included in the multiport adapter, and set the second power value, based on the setting data. The peripheral device connection port may include multiple ports, and the setting data may include data used to set a power value allocated to each of the multiple ports. The controller may be configured to set, based on receiving data indicating a fast-charging mode from the host device through the host connection port or from the input unit, the peripheral device connection port to an inactive state such that power is not supplied to a peripheral device connected to the peripheral device connection port, and reset a value obtained by subtracting the first power value from the maximum power value as a power value of power to be supplied to the host device. The controller may be configured to switch, based on receiving data indicating release of the fast-charging mode from the host device through the host connection port or from the input unit, the peripheral device connection port to an active state, and reset a value obtained by subtracting the first power value and the second power value from the maximum power value as a power value of power to be supplied to the host device.

Each of the power connection port and the host connection port may be a universal serial bus (USB) Type-C port. The controller may be configured to communicate with the host device and the power supply device through a configuration channel (CC) pin or a secondary bus (SBU) pin of the USB Type-C port.

The multiport adapter may further include: a connection wire; a first switch which includes a (1-1)th terminal connected to the controller and a (1-2)th terminal connected to one end of the connection wire, and is configured to connect a signal pin of the host connection port to the (1-1)th terminal or the (1-2)th terminal; and a second switch which includes a (2-1)th terminal connected to the controller and a (2-2)th terminal connected to the other end of the connection wire, and is configured to connect a signal pin of the power connection port to the (2-1)th terminal or the (2-2)th terminal. The power supply circuit may include: a first adjuster having an input terminal connected to the power connection port; a second adjuster having an input terminal connected to an output terminal of the first adjuster; a third adjuster having an input terminal connected to the output terminal of the first adjuster and the input terminal of the second adjuster; a fourth adjuster having an output terminal connected to the peripheral device connection port; a third switch having both terminals which are connected to the input terminal and the output terminal of the first adjuster, respectively; and a fourth switch having both terminals which are connected to the input terminal and an output terminal of the second adjuster, respectively.

The controller may be configured to perform, based on receiving data indicating a fast-charging mode from the host device through the host connection port or from the input unit, a first operation of controlling the first switch and the second switch such that the signal pin of the host connection port is connected the (1-2)th terminal and the signal pin of the power connection port is connected to the (2-2)th terminal and a second operation of activating only the third adjuster among the adjusters and closing the third switch and the fourth switch.

The controller may be configured to set, before closing the third switch and the fourth switch, a voltage of power received from the power supply device through a power pin of the power connection port and a voltage of power transmitted to the host device through a power pin of the host connection port to an identical voltage value.

The controller may be configured to perform a first operation and a second operation, further based on determining the power supply device to be a model having a power adjustment function.

The controller may be configured to determine a version of a protocol for power delivery (PD) communication which the power supply device has and a version of a protocol for PD communication which the host device has, and perform the first operation and the second operation, further based on a fact that the determined versions are equal to or higher than a version of a protocol for PD communication which the multiport adapter has.

In an embodiment, a portable host device (e.g., 202 in FIGS. 2A and 2B) may include: a display; a connection port; and a processor electrically connected to the display and the connection port. The processor (e.g., 120 in FIG. 1 or 202a in FIGS. 5 and 6) may be configured to recognize, based on identification information received from an external electronic device through the connection port, that the external electronic device connected to the connection port is a multiport adapter, display, on the display, a setting screen for setting a power value for each port of the multiport adapter, generate setting data based on a user input received using the setting screen, transmit the setting data to the multiport adapter through the connection port, receive power information about power suppliable from the multiport adapter to the host device from the multiport adapter through the connection port in response to the transmission of the setting data, and transmit, based on the power information, a message requesting the multiport adapter to supply power to the multiport adapter through the connection port.

The host device may further include a controller configured to be driven using power received from the connection port, wherein the controller (e.g., 1340 in FIG. 13) is configured to transmit a message requesting the multiport adapter to operate in a fast-charging mode to the multiport adapter through the connection port when the processor (e.g., 1311 in FIG. 13) operates in a sleep mode or enters a power-off mode in which supply of power to the processor is stopped. The controller may be configured to transmit a message requesting release of the fast-charging mode to the multiport adapter through the connection port when the sleep mode or the power-off mode is released.

The connection port may be a universal serial bus (USB) Type-C port.

In an embodiment, a method for operating a portable host device (e.g., 202 in FIGS. 2A and 2B) may include: recognizing, based on identification information received from an external electronic device through a connection port of the host device, that the external electronic device connected to the connection port is a multiport adapter; displaying, on a display of the host device, a setting screen for setting a power value for each port of the multiport adapter; generating setting data based on a user input received using the setting screen; transmitting the setting data to the multiport adapter through the connection port; receiving power information about power suppliable from the multiport adapter to the host device from the multiport adapter through the connection port in response to the transmission of the setting data (e.g., 540 in FIG. 5); and transmitting, based on the power information, a message requesting the multiport adapter to supply power to the multiport adapter through the connection port (e.g., 550 in FIG. 5).

The host device may include a controller (e.g., 1340 in FIG. 13) configured to be driven using power received from the connection port, and the method may include transmitting, by the controller, a message requesting the multiport adapter to operate in a fast-charging mode to the multiport adapter through the connection port when a processor (e.g., 1311 in FIG. 13) of the host device operates in a sleep mode or enters a power-off mode in which supply of power to the processor is stopped. The method may include transmitting, by the controller, a message requesting release of the fast-charging mode to the multiport adapter through the connection port when the sleep mode or the power-off mode is released.

In various embodiments, a method for operating a multiport adapter (e.g., 200 in FIGS. 2A and 2B) may include: receiving, through a power connection port of the multiport adapter, first power information about power suppliable from a power supply device connected to the multiport adapter to the multiport adapter (e.g., 510 in FIG. 5); determining a maximum power value in the first power information and transmit a message, which requests the power supply device to supply power of the maximum power value to the multiport adapter, to the power supply device through the power connection port (e.g., 520 in FIG. 5); determining a third power value obtained by subtracting, from the maximum power value, a first power value consumed by the multiport adapter and a second power value set to be supplied to a peripheral device through a peripheral device connection port of the multiport adapter (e.g., 530 in FIG. 5); generating, based on the third power value, second power information about power suppliable from the multiport adapter to a host device through a host connection port of the multiport adapter; and transmitting the second power information to the host device through the host connection port (e.g., 540 in FIG. 5).

The method may include: receiving setting data used to set the second power value from the host device through the host connection port or from an input unit included in the multiport adapter; and setting the second power value, based on the setting data.

In an embodiment, a multiport adapter may comprise a power connection port connectable to a power supply device; a host connection port connectable to a host device; a peripheral device connection port connectable to a peripheral device; a controller electrically connected to the power connection port, the host connection port, and the peripheral device connection port; and a power supply circuit configured to receive power from a connected power supply device, divide the received power, and output the divided power to at least one of the host connection port, the peripheral device connection port, and the controller. The controller is configured to: determine first power information comprising a maximum power value suppliable from the connected power supply device, transmit a request to the connected power supply device to supply power at the maximum power value, determine a third power value by subtracting from the maximum power value a first power value consumed by the multiport adapter and a second power value set to be supplied through the peripheral device connection port to a connected peripheral device, and supply power to a connected host device at the third power value through the host connection port.

The multiport adapter may further comprise a current limiting circuit arranged between the power supply circuit and the peripheral device connection port, the current limiting circuit controllable by the controller to limit a current of power supplied to a connected peripheral device to a threshold value set by the controller.

Various embodiments disclosed in the specification and the drawings are merely particular examples provided for easily describing the technical matters according to the embodiments of the disclosure and contributing to understanding embodiments of the disclosure, and are not intended to limit the scope of embodiments of the disclosure. Therefore, it should be construed that all modifications or modified forms capable of being derived from the technical idea of various embodiments of the disclosure in addition to the embodiments disclosed herein are included in the scope various embodiments of the disclosure.

What is claimed is:

1. A multiport adapter comprising:
a power connection port connectable to an external power adapter;
a host connection port connectable to a host device;
a peripheral device connection port connectable to a peripheral device;
a power supply circuit configured to receive power from the external power adapter through the power connection port; and
a controller electrically connected to the power connection port, the host connection port, the power supply circuit, and the peripheral device connection port,
wherein the controller is configured to:
control the power supply circuit to distribute the received power from the external power adapter to the host connection port, the peripheral device connection port, and the controller,
receive, through the power connection port, first power information regarding power suppliable from the external power adapter to the multiport adapter,
identify a maximum power value based on the first power information,
determine a third power value by subtracting from the maximum power value a first power value to be consumed by the multiport adapter and a second power value set to be supplied to a peripheral device through the peripheral device connection port,
generate, based on the third power value, second power information about power suppliable from the multiport adapter to the host device, and
transmit the second power information to the host device through the host connection port.

2. The multiport adapter of claim 1, wherein the controller is configured to
receive setting data used to set the second power value from the host device through the host connection port or from an input unit included in the multiport adapter, and
set the second power value, based on the setting data.

3. The multiport adapter of claim 2, wherein the peripheral device connection port comprises multiple ports, and
the setting data comprises data used to set a power value allocated to each of the multiple ports.

4. The multiport adapter of claim 2, wherein the controller is configured to set, based on receiving a message indicating a fast-charging mode from the host device through the host connection port or from the input unit, the peripheral device connection port to an inactive state such that power is not supplied to a peripheral device connected to the peripheral device connection port, and reset the third power value based on a value obtained by subtracting the first power value from the maximum power value as a power value to be supplied to the host device.

5. The multiport adapter of claim 4, wherein the controller is configured to switch, based on receiving a message indicating release of the fast-charging mode from the host device through the host connection port or from the input unit, the peripheral device connection port to an active state, and reset the third power value based on a value obtained by subtracting the first power value and the second power value from the maximum power value as a power value to be supplied to the host device.

6. The multiport adapter of claim 1, wherein each of the power connection port and the host connection port is a universal serial bus (USB) Type-C port.

7. The multiport adapter of claim 6, wherein the controller is configured to communicate with the host device and the power supply device through a configuration channel (CC) pin or a secondary bus (SBU) pin of the USB Type-C port.

8. The multiport adapter of claim 1, further comprising:
a connection wire;
a first switch comprising a (1-1)th terminal connected to the controller and a (1-2)th terminal connected to one end of the connection wire, and is configured to selectively connect a signal pin of the host connection port to the (1-1)th terminal or the (1-2)th terminal; and
a second switch comprising a (2-1)th terminal connected to the controller and a (2-2)th terminal connected to the other end of the connection wire, and is configured to selectively connect a signal pin of the power connection port to the (2-1)th terminal or the (2-2)th terminal,
wherein the power supply circuit comprises:
a first adjuster having an input terminal connected to the power connection port;

a second adjuster having an input terminal connected to an output terminal of the first adjuster;

a third adjuster having an input terminal connected to the output terminal of the first adjuster and the input terminal of the second adjuster;

a fourth adjuster having an output terminal connected to the peripheral device connection port;

a third switch having a first terminal connected to the input terminal of the first adjuster and a second terminal connected to the output terminal of the first adjuster; and a fourth switch having a first terminal connected to the input terminal of the second adjuster and a second terminal connected to an output terminal of the second adjuster, wherein the controller is configured to perform, based on receiving data indicating a fast-charging mode from the host device through the host connection port or from the input unit, a first operation of controlling the first switch and the second switch such that the signal pin of the host connection port is connected the (1-2)th terminal and the signal pin of the power connection port is connected to the (2-2)th terminal and a second operation of activating the third adjuster among the adjusters and closing the third switch and the fourth switch.

9. The multiport adapter of claim 8, wherein the controller is configured to set, before closing the third switch and the fourth switch, a voltage of power received from the external power adapter through a power pin of the power connection port and a voltage of power supplied to the host device through a power pin of the host connection port to be equal.

10. The multiport adapter of claim 8, wherein the controller is configured to perform the first operation and the second operation based on a determination that the external power adapter has a power adjustment function.

11. The multiport adapter of claim 8, wherein the controller is configured to identify a version of a protocol for power delivery (PD) communication of the external power adapter or the host device and perform the first operation and the second operation based on the identified version.

12. A method for operating a multiport adapter, the method comprising:

receiving, through a power connection port of the multiport adapter, first power information regarding power suppliable from an external power adapter connected to the multiport adapter;

identifying a maximum power value based on the first power information;

determining a third power value by subtracting, from the maximum power value, a first power value to be consumed by the multiport adapter and a second power value to be supplied to a peripheral device through a peripheral device connection port of the multiport adapter;

generating, based on the third power value, second power information regarding power suppliable from the multiport adapter to a host device through a host connection port of the multiport adapter; and transmitting the second power information to the host device through the host connection port.

13. A multiport adapter comprising:

a power connection port connectable to a power supply device;

a host connection port connectable to a host device;

a peripheral device connection port connectable to a peripheral device;

a power supply circuit configured to receive power from the external power adapter; and a controller electrically connected to the power connection port, the host connection port, the peripheral device connection port, and the power supply circuit;

wherein the controller is configured to:

receive first power information comprising a maximum power value suppliable from the external power adapter, determine a third power value by subtracting from the maximum power value a first power value to be consumed by the multiport adapter and a second power value to be supplied through the peripheral device connection port to a connected peripheral device, and supply power to a connected host device based on the third power value through the host connection port.

* * * * *